US012772081B2

(12) United States Patent
Shrestha et al.

(10) Patent No.: US 12,772,081 B2
(45) Date of Patent: Oct. 20, 2026

(54) TECHNIQUES FOR PERFORMING NON-TERRESTRIAL CELL MEASUREMENTS

(71) Applicant: QUALCOMM Incorporated, San Diego, CA (US)

(72) Inventors: Bharat Shrestha, San Diego, CA (US); Umesh Phuyal, San Diego, CA (US); Mungal Singh Dhanda, Slough (GB)

(73) Assignee: QUALCOMM Incorporated, San Diego, CA (US)

( * ) Notice: Subject to any disclaimer, the term of this patent is extended or adjusted under 35 U.S.C. 154(b) by 706 days.

(21) Appl. No.: 17/838,466

(22) Filed: Jun. 13, 2022

(65) Prior Publication Data

US 2023/0403586 A1 Dec. 14, 2023

(51) Int. Cl.
*H04W 24/08* (2009.01)
*H04L 5/00* (2006.01)
*H04W 84/06* (2009.01)

(52) U.S. Cl.
CPC .......... *H04W 24/08* (2013.01); *H04L 5/0048* (2013.01); *H04W 84/06* (2013.01)

(58) Field of Classification Search
None
See application file for complete search history.

(56) References Cited

U.S. PATENT DOCUMENTS

2022/0104224 A1* 3/2022 Choi ..................... H04L 5/0055
2022/0225150 A1* 7/2022 Zheng ................... H04W 24/08
(Continued)

FOREIGN PATENT DOCUMENTS

WO WO-2021120129 A1 6/2021
WO WO-2021219120 A1 11/2021
WO WO-2022084959 A1 4/2022

OTHER PUBLICATIONS

Intel Corporation: "Location based measurement event and location based CHO execution condition for NTN", 3GPP TSG-RAN WG2 Meeting #113, R2-2100383, 3rd Generation Partnership Project, Mobile Competence Centre, 650, Route Des Lucioles, F-06921 Sophia-Antipolis Cedex, France, vol. RAN WG2, No. E-Meeting, USA, Jan. 25, 2021-Feb. 5, 2021, Jan. 15, 2021, 4 Pages, XP051973568, Section 2, in particular "Location based measurement event".
(Continued)

*Primary Examiner* — Peter P Chau
(74) *Attorney, Agent, or Firm* — QUALCOMM Incorporated

(57) ABSTRACT

Methods, systems, and devices for wireless communications are described. A user equipment (UE) may establish a communication session with a network via a non-terrestrial network (NTN) entity. The UE may receive control signaling identifying one or more measurement trigger criteria for measurements of NTN cells. The UE may receive a reference signal from one or more of the NTN cells. The UE may transmit a message that indicates a measurement of the reference signal associated with at least one of the NTN cells. The UE may perform the measurement of the reference signal in response to one or both of a change in received power associated with the NTN entity satisfying a signal power threshold or at least one of the measurement trigger criteria being satisfied. The described techniques may enable the UE to perform NTN cell measurements with greater efficiency and reduced power consumption, among other benefits.

25 Claims, 17 Drawing Sheets

(56) References Cited

U.S. PATENT DOCUMENTS

| | | | | |
|---|---|---|---|---|
| 2022/0386193 | A1* | 12/2022 | Li | H04W 48/02 |
| 2023/0049063 | A1 | 2/2023 | Wu et al. | |
| 2023/0239717 | A1* | 7/2023 | Gao | H04B 7/18563 370/252 |
| 2023/0396323 | A1* | 12/2023 | Yavuz | H04B 7/18513 |
| 2024/0080737 | A1* | 3/2024 | Park | H04W 64/006 |
| 2024/0267798 | A1* | 8/2024 | Zhang | H04W 36/0085 |
| 2025/0031115 | A1* | 1/2025 | Hu | H04W 36/0088 |

OTHER PUBLICATIONS

International Search Report and Written Opinion—PCT/US2023/022365—ISA/EPO—Sep. 8, 2023.

* cited by examiner

TECHNIQUES FOR PERFORMING NON-TERRESTRIAL CELL MEASUREMENTS

FIELD OF TECHNOLOGY

The following relates to wireless communications, including techniques for performing non-terrestrial cell measurements.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some wireless communications systems, a UE may be configured to receive and measure reference signals from nearby cells if certain conditions are met. However, these conditions and measurement procedures may not be suitable for non-terrestrial cells with limited availability.

SUMMARY

The described techniques relate to improved methods, systems, devices, and apparatuses that support techniques for performing non-terrestrial cell measurements. For example, the described techniques provide for configuring a user equipment (UE) with a set of measurement trigger criteria for measuring non-terrestrial network (NTN) cells. In accordance with aspects of the present disclosure, a UE may establish a communication session with a network via an NTN entity. The UE may receive control signaling identifying one or more measurement trigger criteria (also referred to as conditions or parameters) for measurements of NTN cells. The UE may receive a reference signal from one or more of the NTN cells. The UE may transmit a message that indicates a measurement of the reference signal associated with at least one of the NTN cells. The UE may perform the measurement of the reference signal in response to one or both of a change in received power associated with the NTN entity satisfying a signal power threshold or at least one of the measurement trigger criteria being satisfied. The described techniques may enable the UE to perform NTN cell measurements with greater efficiency and reduced power consumption, among other benefits.

A method for wireless communications at a UE is described. The method may include establishing a communication session with a network via a NTN entity, receiving control signaling identifying one or more measurement trigger criteria for measurements of NTN cells, receiving a reference signal from one or more of the NTN cells, and transmitting a message that indicates a measurement of the reference signal associated with at least one of the NTN cells. The measurement may be performed by the UE during a time period that is determined based on one or both of a change in received power associated with the NTN entity satisfying a signal power threshold or at least one of the one or more measurement trigger criteria being satisfied.

An apparatus for wireless communications at a UE is described. The apparatus may include a processor, memory coupled with the processor, and instructions stored in the memory. The instructions may be executable by the processor to cause the apparatus to establish a communication session with a network via a NTN entity, receive control signaling identifying one or more measurement trigger criteria for measurements of NTN cells, receive a reference signal from one or more of the NTN cells, and transmit a message that indicates a measurement of the reference signal associated with at least one of the NTN cells. The measurement may be performed by the UE during a time period that is determined based on one or both of a change in received power associated with the NTN entity satisfying a signal power threshold or at least one of the one or more measurement trigger criteria being satisfied.

Another apparatus for wireless communications at a UE is described. The apparatus may include means for establishing a communication session with a network via a NTN entity, means for receiving control signaling identifying one or more measurement trigger criteria for measurements of NTN cells, means for receiving a reference signal from one or more of the NTN cells, and means for transmitting a message that indicates a measurement of the reference signal associated with at least one of the NTN cells. The measurement may be performed by the UE during a time period that is determined based on one or both of a change in received power associated with the NTN entity satisfying a signal power threshold or at least one of the one or more measurement trigger criteria being satisfied.

A non-transitory computer-readable medium storing code for wireless communications at a UE is described. The code may include instructions executable by a processor to establish a communication session with a network via a NTN entity, receive control signaling identifying one or more measurement trigger criteria for measurements of NTN cells, receive a reference signal from one or more of the NTN cells, and transmit a message that indicates a measurement of the reference signal associated with at least one of the NTN cells. The measurement may be performed by the UE during a time period that is determined based on one or both of a change in received power associated with the NTN entity satisfying a signal power threshold or at least one of the one or more measurement trigger criteria being satisfied.

Some examples of the method, apparatuses, and non-transitory computer-readable medium described herein may further include operations, features, means, or instructions for starting a timer for the time period after the change in received power associated with the NTN entity satisfies the signal power threshold, where the measurement of the reference signal is performed by the UE prior to expiry of the timer.

Some examples of the method, apparatuses, and non-transitory computer-readable medium described herein may further include operations, features, means, or instructions for determining that a distance between the UE and a reference location satisfies a distance-based measurement trigger criterion of the one or more measurement trigger criteria identified by the control signaling, where the measurement of the reference signal is performed by the UE based on the distance-based measurement trigger criterion being satisfied.

Some examples of the method, apparatuses, and non-transitory computer-readable medium described herein may further include operations, features, means, or instructions for determining that a time-based measurement trigger criterion of the one or more measurement trigger criteria is satisfied, where the measurement of the reference signal is performed by the UE based on the time-based measurement trigger criterion being satisfied.

Some examples of the method, apparatuses, and non-transitory computer-readable medium described herein may further include operations, features, means, or instructions for identifying a time window in which the UE does not expect to be scheduled to communicate with the network, where the measurement of the reference signal is performed by the UE within the time window.

Some examples of the method, apparatuses, and non-transitory computer-readable medium described herein may further include operations, features, means, or instructions for transmitting one or more of a random access message, a scheduling request, or an uplink message during a first portion of the time window, where the measurement of the reference signal is performed by the UE during a second portion of the time window that does not overlap with the first portion of the time window.

Some examples of the method, apparatuses, and non-transitory computer-readable medium described herein may further include operations, features, means, or instructions for transmitting UE assistance information that indicates a location of the UE, an estimated serving duration for a cell supported by the NTN entity, or both.

Some examples of the method, apparatuses, and non-transitory computer-readable medium described herein may further include operations, features, means, or instructions for starting a timer for the time period in response to determining that a quantity of consecutive out-of-synchronization indications obtained by the UE satisfies a threshold quantity and that a distance between the UE and a reference location corresponding to a coverage area of a cell supported by the NTN entity satisfies a distance-based measurement trigger criterion of the one or more measurement trigger criteria identified by the control signaling.

Some examples of the method, apparatuses, and non-transitory computer-readable medium described herein may further include operations, features, means, or instructions for stopping the timer when a quantity of consecutive in-synchronization indications obtained by the UE satisfies a second threshold quantity and the distance between the UE and the reference location fails to satisfy the distance-based measurement trigger criterion.

In some examples of the method, apparatuses, and non-transitory computer-readable medium described herein, the measurement of the reference signal may be performed by the UE prior to expiry of the timer.

In some examples of the method, apparatuses, and non-transitory computer-readable medium described herein, the measurement of the reference signal may be performed by the UE after expiry of the timer.

In some examples of the method, apparatuses, and non-transitory computer-readable medium described herein, a radio link failure procedure may be performed by the UE after expiry of the timer.

Some examples of the method, apparatuses, and non-transitory computer-readable medium described herein may further include operations, features, means, or instructions for receiving a control message indicating a list of candidate cells, a list of candidate frequencies, or any combination thereof, where the measurement of the reference signal is performed by the UE based on the control message.

In some examples of the method, apparatuses, and non-transitory computer-readable medium described herein, the control message indicates a network type, an orbit type, a NTN identifier, a reference signal offset with respect to the NTN entity, one or more common timing advance (TA) parameters, or a combination thereof for the list of candidate cells, the list of candidate frequencies, or both.

Some examples of the method, apparatuses, and non-transitory computer-readable medium described herein may further include operations, features, means, or instructions for receiving a control message indicating a measurement time window corresponding to a beam center associated with one of the NTN cells, a reference location, a location of the UE, a time duration in which at least one of the NTN cells can provide coverage to the UE, or a combination thereof, where the measurement of the reference signal is performed by the UE within the measurement time window.

Some examples of the method, apparatuses, and non-transitory computer-readable medium described herein may further include operations, features, means, or instructions for performing, by the UE prior to measurement of the reference signal associated with at least one of the NTN cells, a retuning procedure from a first frequency associated with the communication session to at least one second frequency associated with at least one of the NTN cells.

In some examples of the method, apparatuses, and non-transitory computer-readable medium described herein, the measurement of the reference signal may be performed by the UE during a gap period between two scheduled transmissions, the gap period includes one or more physical downlink control channel (PDCCH) periods, and the two scheduled transmissions include a hybrid automatic repeat request (HARQ) feedback transmission and a subsequent uplink or downlink transmission.

In some examples of the method, apparatuses, and non-transitory computer-readable medium described herein, the gap period may be based on a downlink time slot in which the subsequent uplink or downlink transmission is scheduled, a TA value reported by the UE, an offset parameter indicated by a system information block (SIB), a round trip time associated with the HARQ feedback transmission, or a combination thereof.

A method for wireless communications at a network entity is described. The method may include establishing a communication session with a UE, outputting control signaling identifying one or more measurement trigger criteria for measurements of NTN cells, outputting a reference signal via a NTN cell supported by the network entity, and obtaining a message that indicates a measurement of the reference signal associated with at least one of the NTN cells. The measurement may be performed during a time period that is determined based on one or both of a change in received power associated with the network entity satisfying a signal power threshold or at least one of the one or more measurement trigger criteria being satisfied.

An apparatus for wireless communications at a network entity is described. The apparatus may include a processor, memory coupled with the processor, and instructions stored in the memory. The instructions may be executable by the processor to cause the apparatus to establish a communication session with a UE, output control signaling identifying one or more measurement trigger criteria for measurements of NTN cells, output a reference signal via a NTN cell supported by the network entity, and obtain a message that indicates a measurement of the reference signal associated with at least one of the NTN cells. The measurement may be performed during a time period that is determined based on one or both of a change in received power associated with the network entity satisfying a signal power threshold or at least one of the one or more measurement trigger criteria being satisfied.

Another apparatus for wireless communications at a network entity is described. The apparatus may include means for establishing a communication session with a UE, means for outputting control signaling identifying one or more measurement trigger criteria for measurements of NTN cells, means for outputting a reference signal via a NTN cell supported by the network entity, and means for obtaining a message that indicates a measurement of the reference signal associated with at least one of the NTN cells. The measurement may be performed during a time period that is determined based on one or both of a change in received power associated with the network entity satisfying a signal power threshold or at least one of the one or more measurement trigger criteria being satisfied.

A non-transitory computer-readable medium storing code for wireless communications at a network entity is described. The code may include instructions executable by a processor to establish a communication session with a UE, output control signaling identifying one or more measurement trigger criteria for measurements of NTN cells, output a reference signal via a NTN cell supported by the network entity, and obtain a message that indicates a measurement of the reference signal associated with at least one of the NTN cells. The measurement may be performed during a time period that is determined based on one or both of a change in received power associated with the network entity satisfying a signal power threshold or at least one of the one or more measurement trigger criteria being satisfied.

In some examples of the method, apparatuses, and non-transitory computer-readable medium described herein, the measurement of the reference signal may be performed prior to expiry of a timer for the time period that starts when the change in received power associated with the network entity satisfies the signal power threshold and the control signaling indicates the signal power threshold, a duration of the timer, or both.

In some examples of the method, apparatuses, and non-transitory computer-readable medium described herein, the measurement of the reference signal may be performed in response to a distance between the UE and a reference location satisfying a distance-based measurement trigger criterion of the one or more measurement trigger criteria identified by the control signaling.

In some examples of the method, apparatuses, and non-transitory computer-readable medium described herein, the measurement of the reference signal may be performed in response to a time-based measurement trigger criterion of the one or more measurement trigger criteria being satisfied.

In some examples of the method, apparatuses, and non-transitory computer-readable medium described herein, the measurement of the reference signal may be performed within a time window in which the UE does not expect to be scheduled to communicate with the network entity.

Some examples of the method, apparatuses, and non-transitory computer-readable medium described herein may further include operations, features, means, or instructions for obtaining one or more of a random access message, a scheduling request, or an uplink message during a first portion of the time window, where the measurement of the reference signal may be performed during a second portion of the time window that does not overlap with the first portion of the time window.

Some examples of the method, apparatuses, and non-transitory computer-readable medium described herein may further include operations, features, means, or instructions for obtaining UE assistance information that indicates a location of the UE, an estimated serving duration for the NTN cell supported by the network entity, or both.

In some examples of the method, apparatuses, and non-transitory computer-readable medium described herein, the measurement of the reference signal may be performed in response to a quantity of consecutive out-of-synchronization indications satisfying a threshold quantity and a distance between the UE and the network entity satisfying a distance-based measurement trigger criterion of the one or more measurement trigger criteria identified by the control signaling.

Some examples of the method, apparatuses, and non-transitory computer-readable medium described herein may further include operations, features, means, or instructions for outputting a control message indicating a list of candidate cells, a list of candidate frequencies, or any combination thereof, where the measurement of the reference signal is performed based on the control message.

Some examples of the method, apparatuses, and non-transitory computer-readable medium described herein may further include operations, features, means, or instructions for outputting a control message indicating a measurement time window corresponding to a beam center associated with one of the NTN cells, a reference location, a location of the UE, a time duration in which at least one of the NTN cells can provide coverage to the UE, or a combination thereof, where the measurement of the reference signal is performed within the measurement time window.

DETAILED DESCRIPTION

Figure 1:
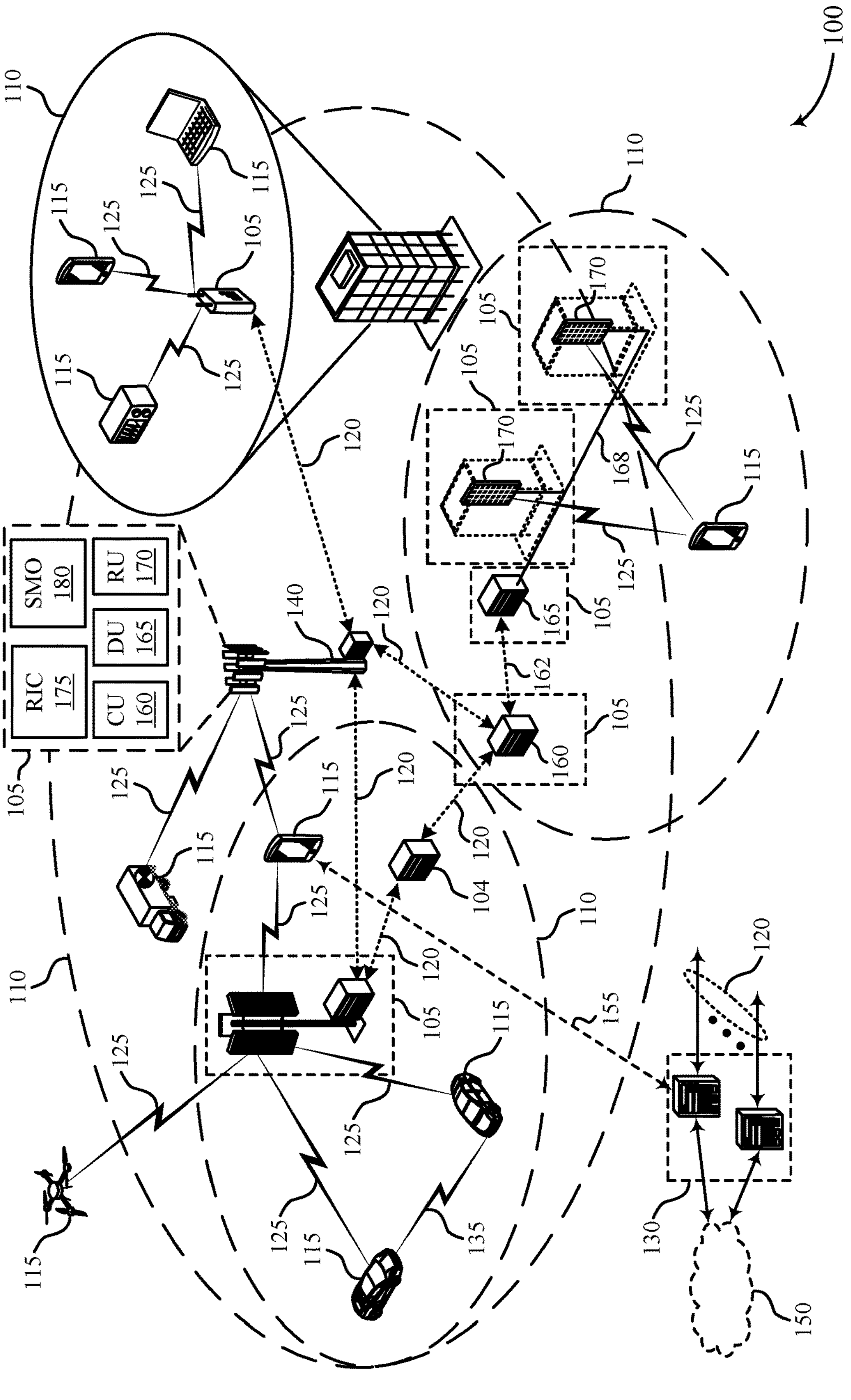
FIGS. 1 and 2 illustrate examples of wireless communications systems that support techniques for performing non-terrestrial cell measurements in accordance with one or more aspects of the present disclosure.

In some wireless communications systems, a narrowband Internet of Things (NB-IoT) user equipment (UE) may be configured to perform periodic measurements of nearby cells (also referred to herein as neighbor cells). The NB-IoT UE may perform and report these measurements to a network entity while the NB-IoT UE is in a connected mode. In some cases, the NB-IoT UE may be configured to perform measurements of one or more neighbor cells if a narrowband reference signal received power (NRSRP) associated with a serving cell of the NB-IoT UE drops by a threshold value. More specifically, the NB-IoT UE may initiate a timer after the NRSRP of the serving cell decreases by the threshold value. While the timer is active (e.g., unexpired), the NB-IoT UE may perform measurements of reference signals from the one or more neighboring cells. The cell measurements obtained by the NB-IoT UE may assist with cell search and selection processes at the NB-IoT UE.

However, some cell measurement procedures may not be suitable for non-terrestrial networks (NTNs). As described herein, an NTN may refer to a wireless network that includes one or more satellites, zeppelins, planes, drones, dirigibles, or other non-terrestrial devices. Terrestrial cell measurement procedures may not be suitable for NTN deployments because a UE may be unable to access or measure an NTN cell supported by a non-terrestrial device (e.g., a satellite) if a distance between the non-terrestrial device and the UE is greater than a threshold. In other words, the UE may be limited to performing NTN cell measurements within specific time windows (e.g., when a coverage area of an NTN cell coincides with a location of the UE). Attempting to perform measurements of NTN cells outside of these windows may result in unnecessary power consumption at the UE.

In accordance with aspects of the present disclosure, a UE may be configured with a set of cell measurement trigger criteria (also referred to herein as trigger conditions or trigger parameters) that are specific to NTN. These NTN-specific trigger criteria may include distance-based trigger criteria and time-based trigger criteria. As an example, the UE may initiate an NTN cell measurement procedure when a distance between the UE and a reference point exceeds a threshold (e.g., when a distance-based trigger criterion is satisfied). Additionally or alternatively, the UE may be configured to perform measurements of NTN cells within a specific time window (e.g., when a time-based trigger criterion is satisfied). These NTN-specific trigger criteria may be defined or signaled to the UE via radio resource control (RRC) signaling, downlink control information (DCI), or a medium access control (MAC) control element (CE), among other examples.

The NTN-specific trigger criteria described herein may be used in combination with or as an alternative to terrestrial NB-IoT measurement criteria. For example, the UE may initiate a timer and begin performing NTN cell measurements if an NRSRP associated with a serving cell of the UE decreases by a threshold value, if a time-based NTN cell measurement trigger criterion is satisfied, if a distance-based NTN cell measurement trigger criterion is satisfied, or any combination thereof. To improve the efficiency of NTN cell measurement procedures at the UE, a network entity may provide the UE with assistance information such as a candidate cell list, timing information, cell network type information, reference signal offset information, or a combination thereof. Additionally or alternatively, the UE may provide the network with assistance information such as a location of the UE or an estimated serving duration of an NTN cell.

Aspects of the present disclosure may be implemented to realize one or more of the following advantages. The described techniques may enable a UE to perform NTN cell measurements with greater efficiency and reduced power consumption, among other benefits. For example, configuring a UE to refrain from measuring an NTN cell until the UE is within range of the NTN cell may reduce the number of extraneous measurements performed by the UE. Moreover, providing the UE with assistance information (e.g., location information, candidate cell information, timing information) may reduce the quantity of blind cell search procedures performed by the UE, which may reduce the latency and power consumption associated with cell search and selection at the UE.

Aspects of the disclosure are initially described in the context of wireless communications systems, communication timelines, and process flows. Aspects of the disclosure are further illustrated by and described with reference to apparatus diagrams, system diagrams, and flowcharts that relate to techniques for performing non-terrestrial cell measurements.

FIG. 1 illustrates an example of a wireless communications system 100 that supports techniques for performing non-terrestrial cell measurements in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for performing non-terrestrial cell measurements as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an IoT device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARD) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

Some NB-IoT UEs may be configured to perform neighbor cell measurements in a connected mode (e.g., RRC_CONNECTED). However, similar approaches can be used for idle mode (e.g., RRC_IDLE) relaxed neighbour cell monitoring. An NB-IoT UE may start a timer (e.g., T326 with a value of t-MeasureDeltaP) when an NRSRP associated with a serving cell of the NB-IoT UE degrades (e.g., decreases, drops, falls) by a threshold value (s-MeasureDeltaP). The NB-IoT UE may determine the change in NRSRP with respect to a reference NRSRP (NRSRPref), which may be the last NRSRP measurement performed by the NB-IoT UE prior to entering a connected state. This reference NRSRP value may be updated whenever the threshold value (s-MeasureDeltaP) is exceeded. While the timer (T326) is active, the NB-IoT UE may perform neighbour cell measurements if certain criteria are satisfied. These techniques may be applicable to different frequency combinations (inter-frequency, intra-frequency) and coverage levels.

In accordance with aspects of the present disclosure, a UE 115 may establish a communication session with a network entity 105 that is associated with an NTN. The UE 115 may receive control signaling identifying one or more measurement trigger criteria for measurements of NTN cells. As described herein, an NTN cell may refer to a coverage area or geographic region served by a non-terrestrial device (e.g., a satellite). After receiving the control signaling, the UE 115 may receive a reference signal via one or more NTN cells. The UE 115 may transmit a message that indicates a measurement of the reference signal associated with at least one of the NTN cells. The UE 115 may perform the measurement of the reference signal in response to one or both of a change in received power associated with the network entity 105 satisfying a signal power threshold or at least one of the measurement trigger criteria being satisfied.

Aspects of the wireless communications system 100 may be implemented to realize one or more of the following advantages. The techniques described with reference to FIG. 1 may enable a UE 115 to perform NTN cell measurements with greater efficiency and reduced power consumption, among other benefits. For example, configuring a UE 115 to refrain from measuring an NTN cell until the UE 115 is within range of the NTN cell may reduce the number of extraneous measurements performed by the UE 115. Moreover, providing the UE 115 with assistance information (e.g., location information, candidate cell information, timing information) may reduce the quantity of blind cell search procedures performed by the UE 115, which may reduce the latency and power consumption associated with cell search and selection at the UE 115.

Figure 2:
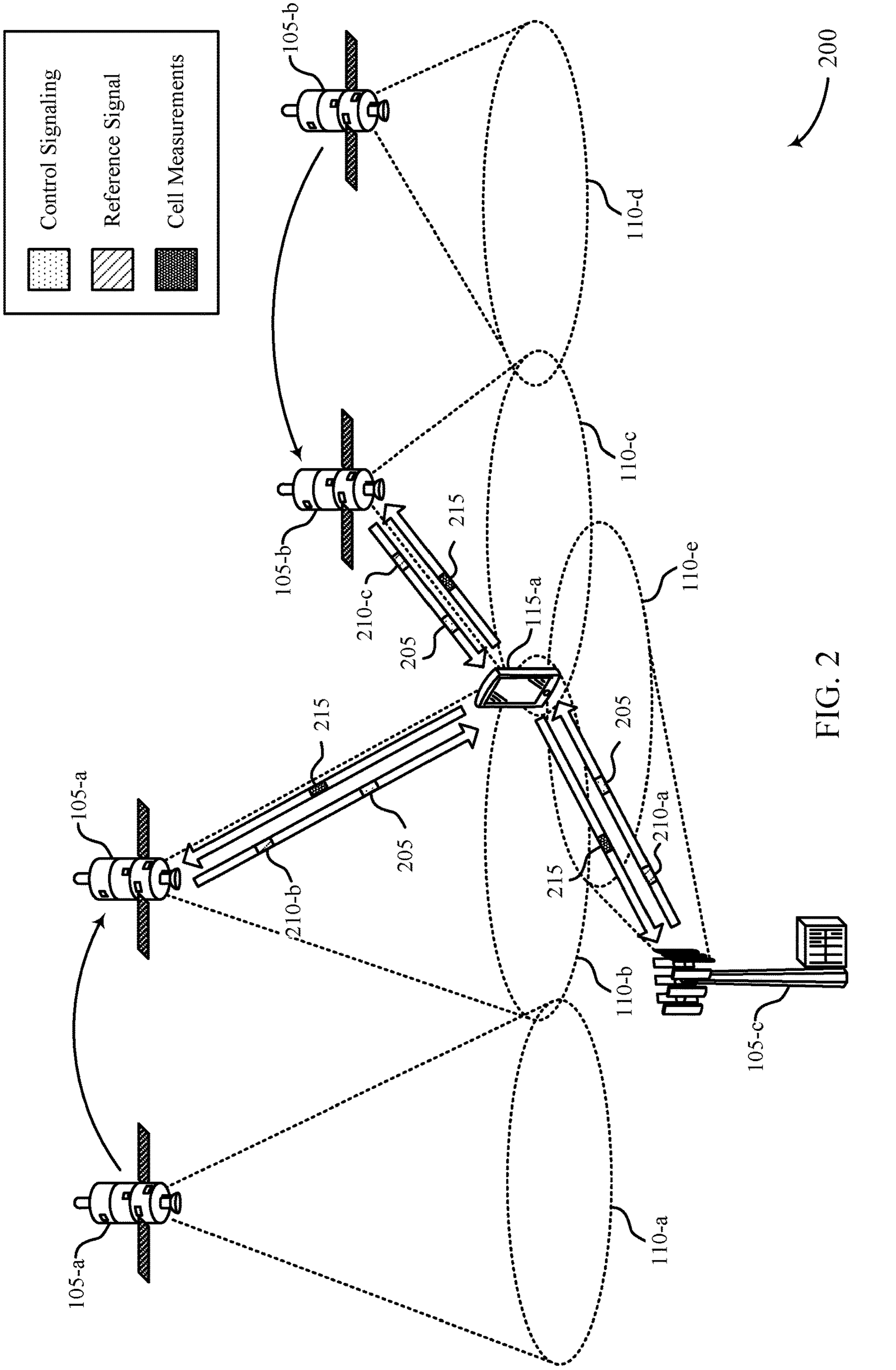

FIG. 2 illustrates an example of a wireless communications system 200 that supports techniques for performing non-terrestrial cell measurements in accordance with one or more aspects of the present disclosure. The wireless communications system 200 may implement or be implemented by aspects of wireless communications system 100. For example, the wireless communications system 200 may include a network entity 105-*a*, a network entity 105-*b*, a network entity 105-*c*, and a UE 115-*a*, which may be examples of corresponding devices described with reference to FIG. 1. The network entity 105-*a* and the network entity 105-*b* may be associated with an NTN, whereas the network entity 105-*c* may be associated with a terrestrial network. The wireless communications system 200 may also include a coverage area 110-*a*, a coverage area 110-*b*, a coverage area 110-*c*, a coverage area 110-*d*, and a coverage area 110-*e*, which may be examples of a coverage area 110 described with reference to FIG. 1. In the wireless communications system 200, the UE 115-*a* may receive and measure one or more reference signals via NTN cells supported by the network entities 105.

In some wireless communications systems, support of neighbour cell measurements and corresponding measurement triggering criteria (prior to initiating a radio link failure (RLF) procedure) may use terrestrial NB-IoT and eMTC as a baseline. However, some NTN-specific features may be added to these procedures. More specifically, time-based criteria and location-based criteria can be used (in addition to the criteria described with reference to FIG. 1) to trigger NTN neighbor cell measurements. For example, the UE 115-*a* may start a timer (T326 with a value of t-MeasureDeltaP) when the NRSRP associated with a serving cell of the UE 115-*a* degrades by a threshold value (s-MeasureDeltaP), when the UE 115-*a* satisfies a distance-based criterion (e.g., when a distance between the UE 115-*a* and a reference point is greater than a threshold), when the UE 115-*a* satisfies a time-based criterion (e.g., when the UE is within a time window defined by a first time $T_1$ and a second time $T_2$). If the network configures the UE 115-*a* with a measurement window, the network may refrain from scheduling physical downlink control channel (PDCCH) transmissions within the measurement window. However, the UE 115-*a* may still be able to transmit random access channel (RACH) transmissions or scheduling requests within the measurement window (e.g., the UE 115-*a* can utilize uplink resources within the measurement window).

The UE 115-*a* may perform the cell measurements in a connected mode, an idle mode, or an inactive mode. In some examples, the UE 115-*a* may transmit assistance information (location, estimated cell serving duration) to one or more of the network entities 105. Likewise, the network entities 105 may provide assistance information to the UE 115-*a* (to assist the UE 115-*a* with cell measurements). Alternatively, the UE 115-*a* may determine whether (and how) to perform cell measurements without assistance information from the network entities 105. The assistance information provided by the network entities 105 may indicate a list of candidate cells or frequencies, a possible measurement time window corresponding to a beam center, a location of the UE 115-*a*, or a reference location, among other examples. For moving cells, the time window may enable the UE 115-*a* to determine when cell coverage is likely to be in the vicinity of the UE 115-*a*.

The assistance information provided by the network entities 105 may also indicate that the serving time of a specific cell (within a measurement time window) is at least X seconds. The network entities 105 may also provide an indication of whether a cell is a terrestrial network cell, a low-earth orbit (LEO) NTN cell, or a geostationary orbit (GEO) NTN cell. Similarly, the network entities 105 may indicate whether two cells are associated with the same satellite or different satellites. The network entities 105 may also indicate a neighbor cell reference signal offset with respect to a serving cell reference signal. Additionally or alternatively, the network entities 105 may provide the UE 115-*a* with change rate information (e.g., common timing advance (TA) parameters).

In the example of FIG. 2, the UE 115-*a* may receive control signaling 205 from one or more of the network entities 105. The control signaling 205 may indicate one or more cell measurement trigger criteria that are specific to NTN. These criteria may include time-based criteria, distance-based criteria, or both. The control signaling 205 may also include network assistance information that indicates one or more of a cell type, an orbit type, an identifier, a reference signal offset, or TA criteria for one or more neighbor cells. The UE 115-*a* may then perform measurements of reference signals from the network entities 105 in accordance with the control signaling 205. For example, the UE 115-*a* may perform measurements of a reference signal 210-*a* from the network entity 105-*c* when the UE 115-*a* is within the coverage area 110-*e* (e.g., a terrestrial cell supported by the network entity 105-*c*). Likewise, the UE 115-*a* may perform measurements of a reference signal 210-*b* from the network entity 105-*a* when the UE 115-*a* is within the coverage area 110-*b* (e.g., an NTN cell supported by the network entity 105-*a*). Similarly, the UE 115-*a* may perform measurements of a reference signal 210-*c* from the network entity 105-*b* when the UE 115-*a* is within the coverage area 110-*c* (e.g., an NTN cell supported by the network entity 105-*b*). After receiving and measuring one or more reference signals from the network entities 105, the UE 115-*a* may transmit an indication of cell measurements 215 to one or more of the network entities 105.

Aspects of the wireless communications system 200 may be implemented to realize one or more of the following advantages. The techniques described with reference to FIG. 2 may enable the UE 115-*a* to perform NTN cell measurements with greater efficiency and reduced power consumption, among other benefits. For example, configuring the UE 115-*a* to refrain from measuring an NTN cell (e.g., a cell supported by the network entity 105-*a*) until the UE 115-*a* is within range of the NTN cell may reduce the number of extraneous measurements performed by the UE 115-*a*. Moreover, providing the UE 115-*a* with assistance information (e.g., location information, candidate cell information, timing information) may reduce the quantity of blind cell search procedures performed by the UE 115-*a*, which may reduce the latency and power consumption associated with cell search and selection at the UE 115-*a*.

Figure 3:
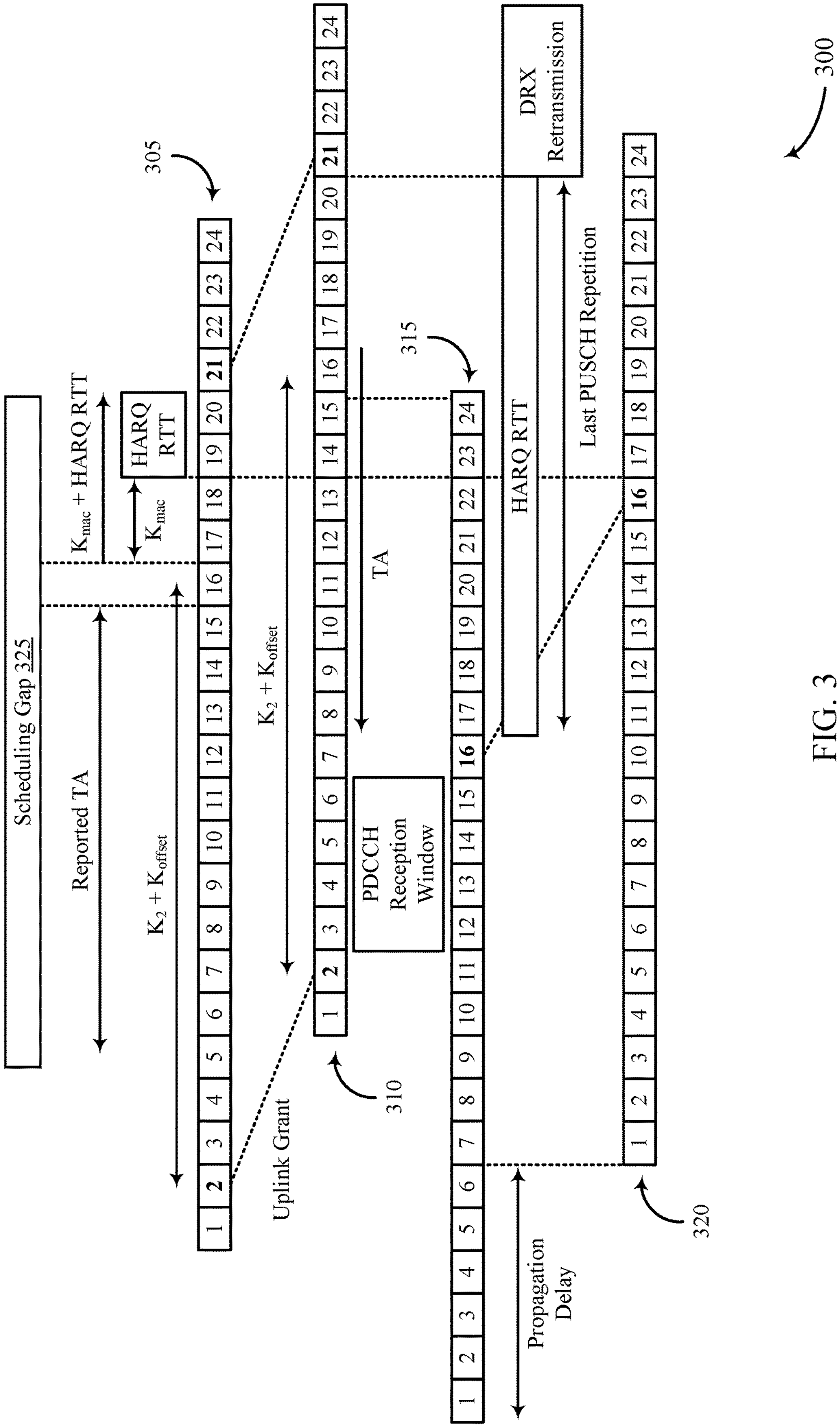
FIGS. 3, 4A, and 4B illustrate examples of communication timelines that support techniques for performing non-terrestrial cell measurements in accordance with one or more aspects of the present disclosure.

FIG. 3 illustrates an example of a communication timeline 300 that supports techniques for performing non-terrestrial cell measurements in accordance with one or more aspects of the present disclosure. The communication timeline 300 may implement or be implemented by aspects of the wireless communications system 100 or the wireless communications system 200. For example, the communication timeline 300 may be implemented by a UE 115 or a network entity 105, as described with reference to FIGS. 1 and 2. The communication timeline 300 may include a downlink timeline 305 for a network entity, a downlink timeline 310 for a UE, an uplink timeline 315 for the UE, and an uplink timeline 320 for the network entity. As illustrated in the communication timeline 300, the UE may perform neighbor NTN cell measurements during a scheduling gap configured by the network entity.

As described herein with reference to FIGS. 1 and 2, a UE may be configured with a set of cell measurement trigger criteria that are specific to NTN. These NTN-specific trigger criteria may include distance-based trigger criteria and time-based trigger criteria. As an example, the UE may initiate an NTN cell measurement procedure when a distance between the UE and a reference point exceeds a threshold (e.g., when a distance-based trigger criterion is satisfied). Additionally or alternatively, the UE may be configured to perform measurements of NTN cells within a specific time window (e.g., when a time-based trigger criterion is satisfied). These NTN-specific trigger criteria may be defined or signaled to the UE via RRC signaling, DCI, or a MAC-CE, among other examples.

The NTN-specific trigger criteria described herein may be used in combination with or as an alternative to terrestrial NB-IoT measurement criteria. For example, the UE may initiate a timer and begin performing NTN cell measurements if an NRSRP associated with a serving cell of the UE decreases by a threshold value, if a time-based NTN cell measurement trigger criterion is satisfied, if a distance-based NTN cell measurement trigger criterion is satisfied, or any combination thereof. To improve the efficiency of NTN cell measurement procedures at the UE, a network entity may provide the UE with assistance information such as a candidate cell list, timing information, cell network type information, reference signal offset information, or a combination thereof. Additionally or alternatively, the UE may provide the network with assistance information such as a location of the UE or an estimated serving duration of an NTN cell.

In some examples, the network may provide the UE with a blank period (e.g., blank subframes) such that the UE can retune to a different carrier or frequency prior to performing neighbor cell measurements. In other examples, the network may provide a scheduling gap 325 between any two subsequent uplink or downlink transmissions. This scheduling gap 325 may include one or more PDCCH periods. In some examples, the scheduling gap 325 may start when the UE transmits HARQ feedback and end when the next uplink or downlink transmission is expected. The scheduling gap 325 can be configured with respect to a downlink time slot n in which an upcoming uplink or downlink transmission is scheduled. This scheduling gap 325 may be based on a TA value reported by the UE and a value of $K_{mac}$ broadcasted in a system information block (SIB) such that the network and the UE are in-sync. In the example of FIG. 3, the scheduling gap 325 begins at a first time $T_1$ (slot n−the TA value reported by the UE) and ends at a second time $T_2$ (slot n+$K_{mac}$+HARQ RTT). However, it is to be understood that the scheduling gap 325 may be configured with any number of different reference points and durations.

In the downlink timeline 305, the network may configure an offset ($K_2$+$K_{offset}$) that spans slots 2 through 16. A reported TA of the UE may span slots 5 through A combination of $K_{mac}$ (an offset between uplink and downlink operations at the network entity) and a HARQ RTT may span slots 17 through 20. There may be a propagation delay between the downlink timeline 305 and the downlink timeline 310. In the example of FIG. 3, this propagation delay may be equal to 5 slots. However, it is to be understood that the propagation delay may have different values in different scenarios. The network entity may transmit an uplink grant to the UE in slot 2 of the downlink timeline 305, which may arrive at the UE in slot 7 of the downlink timeline 305 (slot 2 of the downlink timeline 310). The UE may be capable of receiving PDCCH transmissions in slots 3 through 7 of the downlink timeline 310 (e.g., within a PDCCH reception window). The TA of the UE may span slots 8 through 16 of the downlink timeline 310.

There may also be a propagation delay between the uplink timeline 315 and the uplink timeline 320. This propagation delay may have a duration that is equal to the summation of $K_{mac}$ and the TA value reported by the UE. In the example of FIG. 3, this duration may be equivalent to 6 slots. However, it is to be understood that the duration of this propagation delay may also depend on a distance between the UE and the network entity, conditions of a wireless medium between the UE and the network entity, an orientation between the UE and the network entity, or a combination thereof. A HARQ RTT timer of the UE may span slots 11 through 23 of the uplink timeline 320. A DRX retransmission timer of the UE may start in slot 24 of the uplink timeline 320 (after the HARQ RTT timer). A last physical uplink shared channel (PUSCH) repetition performed by the UE (in accordance with the uplink grant received from the network entity) may be equal to a summation of $K_{mac}$, the HARQ RTT timer of the UE, and the TA value reported by the UE. In the example of FIG. 3, the last PUSCH repetition may span slots 11 through 23 of the uplink timeline 320.

Aspects of the communication timeline 300 may be implemented to realize one or more of the following advantages. The techniques described with reference to FIG. 3 may enable a UE to perform NTN cell measurements with greater efficiency and reduced power consumption, among other benefits. For example, configuring a UE to refrain from measuring an NTN cell until the UE is within range of the NTN cell may reduce the number of extraneous measurements performed by the UE. Moreover, providing the UE with assistance information (e.g., location information, candidate cell information, timing information) may reduce the quantity of blind cell search procedures performed by the UE, which may reduce the latency and power consumption associated with cell search and selection at the UE.

Figure 4A:
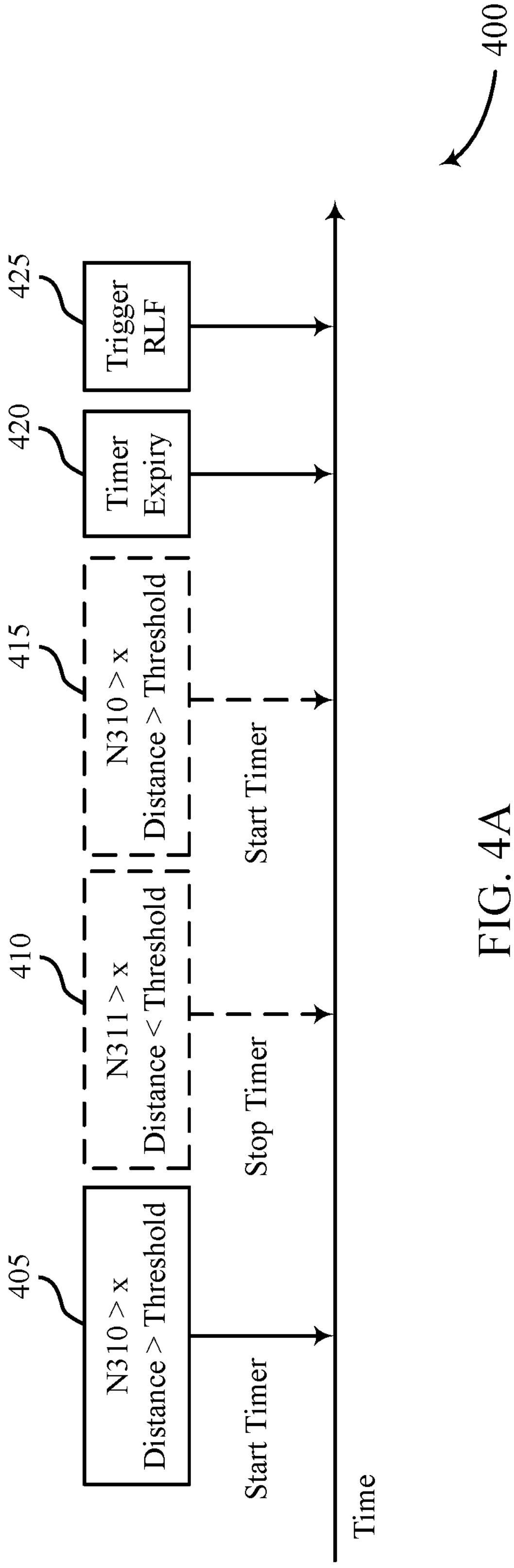
Figure 4B:
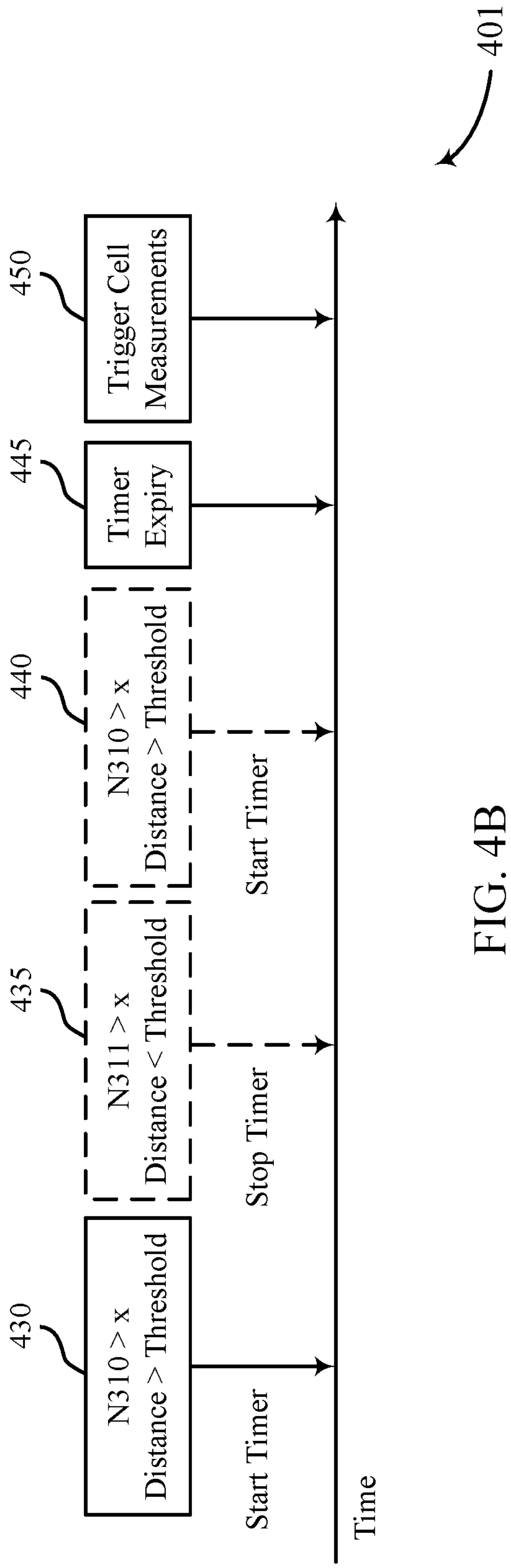

FIGS. 4A and 4B illustrate examples of a communication timeline 400 and a communication timeline 401 that support techniques for performing non-terrestrial cell measurements in accordance with one or more aspects of the present disclosure. The communication timeline 400 and the communication timeline 401 may implement or be implemented by aspects of the wireless communications system 100 or the wireless communications system 200. For example, the communication timeline 400 and the communication timeline 401 may be implemented by a UE 115, as described with reference to FIGS. 1 and 2. In the communication timeline 400 and the communication timeline 401, a UE may start and stop a timer (e.g., a T310_2 timer) based on various measurement trigger criteria. In the communication timeline 400, the UE may trigger an RLF procedure upon expiry of the timer. In the communication timeline 401, the UE may trigger a neighbor cell measurement procedure upon expiry of the timer.

As described with reference to FIGS. 1 through 3, a UE may be configured with a set of cell measurement trigger criteria that are specific to NTN. These NTN-specific trigger criteria may include distance-based trigger criteria and time-based trigger criteria. As an example, the UE may initiate an NTN cell measurement procedure when a distance between the UE and a reference point exceeds a threshold (e.g., when a distance-based trigger criterion is satisfied). Additionally or alternatively, the UE may be configured to perform measurements of NTN cells within a specific time window (e.g., when a time-based trigger criterion is satisfied) or during a time period in which the UE does not expect to receive downlink transmissions from the network.

The NTN-specific trigger criteria described herein may be used in combination with or as an alternative to terrestrial NB-IoT measurement criteria. For example, the UE may initiate a timer and begin performing NTN cell measurements if an NRSRP associated with a serving cell of the UE decreases by a threshold value, if a time-based NTN cell measurement trigger criterion is satisfied, if a distance-based NTN cell measurement trigger criterion is satisfied, or any combination thereof. To improve the efficiency of NTN cell measurement procedures at the UE, a network entity may provide the UE with assistance information such as a candidate cell list, timing information, cell network type information, reference signal offset information, or a combination thereof. Additionally or alternatively, the UE may provide the network with assistance information such as a location of the UE or an estimated serving duration of an NTN cell.

The UE may determine whether to initiate RLF or neighbor cell measurements (after expiry of a T326 timer) by monitoring a synchronization status between the UE and a serving cell of the UE. When a number of consecutive out-of-sync indications (N310) obtained from lower layers surpasses a threshold (0 or x) and a distance between the UE and a reference location (the center of a serving cell coverage area) is greater than a threshold distance (D_thresh), the UE may start a timer (T310_2). When a number of consecutive in-sync indications (N311) obtained from lower layers surpasses a threshold (0 or x) and the distance between the UE and the reference location drops below the threshold distance, the UE may stop the timer. In the communication timeline 400, the UE may trigger RLF upon expiry of the timer. In the communication timeline 401, the UE may trigger neighbor cell measurements upon expiry of the timer.

In the example of FIG. 4A, the UE may start a timer (T310_2) at 405 when a number of consecutive out-of-sync indications (N310) obtained from lower layers surpasses a threshold quantity (0 or x) and a distance between the UE and a reference point is above a threshold distance (D_thresh). In some examples, the UE may stop the timer at 410 when a number of consecutive in-sync indications (N311) obtained from lower layers surpasses the threshold quantity and the distance between the UE and the reference point is below the threshold distance. In such examples, the UE may restart the timer at 415 if the number of consecutive out-of-sync indications surpasses the threshold quantity and the distance between the UE and the reference point exceeds the threshold distance again. At 420, the UE may determine that the timer has expired. At 425, the UE may trigger an RLF procedure upon expiry of the timer.

In the example of FIG. 4B, the UE may start a timer (T310_2) at 430 when a number of consecutive out-of-sync indications (N310) obtained from lower layers surpasses a threshold quantity (0 or x) and a distance between the UE and a reference point is above a threshold distance (D_thresh). In some examples, the UE may stop the timer at 435 when the number of consecutive in-sync indications (N311) obtained from lower layers surpasses the threshold quantity and the distance between the UE and the reference point is below the threshold distance. In such examples, the UE may restart the timer at 440 if the number of consecutive out-of-sync indications surpasses the threshold quantity again and the distance between the UE and the reference point is above the threshold distance. At 445, the UE may determine that the timer is expired. At 450, the UE may trigger neighbor cell measurements upon expiry of the timer.

Aspects of the communication timeline 400 and the communication timeline 401 may be implemented to realize one or more of the following advantages. The techniques described with reference to FIG. 4 may enable a UE to perform NTN cell measurements with greater efficiency and reduced power consumption, among other benefits. For example, configuring a UE to refrain from measuring an NTN cell until the UE is within range of the NTN cell may reduce the number of extraneous measurements performed by the UE. Moreover, providing the UE with assistance information (e.g., location information, candidate cell information, timing information) may reduce the quantity of blind cell search procedures performed by the UE, which may reduce the latency and power consumption associated with cell search and selection at the UE.

Figure 5:
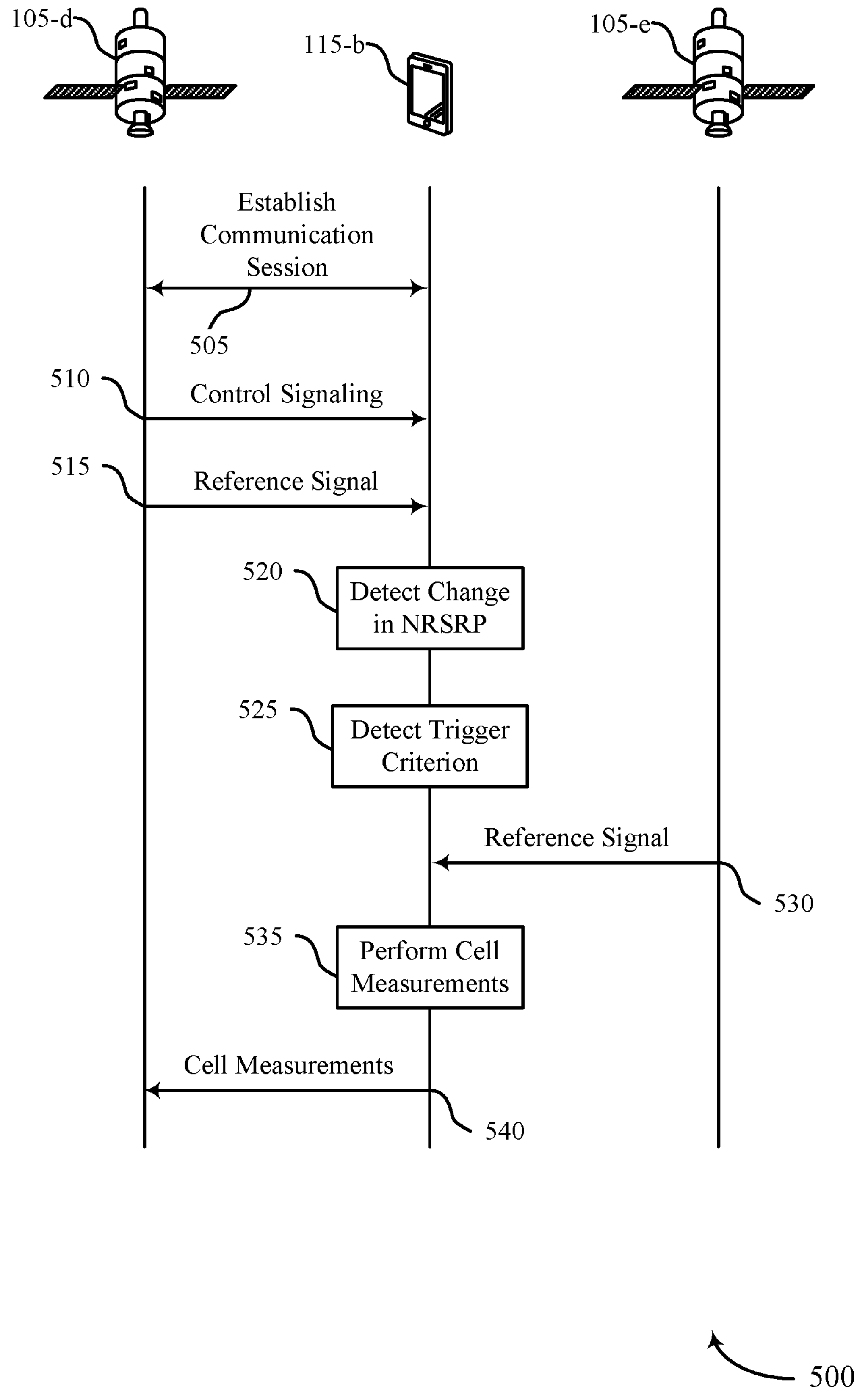
FIG. 5 illustrates an example of a process flow that supports techniques for performing non-terrestrial cell measurements in accordance with one or more aspects of the present disclosure.

FIG. 5 illustrates an example of a process flow 500 that supports techniques for performing non-terrestrial cell measurements in accordance with one or more aspects of the present disclosure. The process flow 500 may implement or be implemented by aspects of the wireless communications system 100 or the wireless communications system 200. For example, the process flow 500 may include a network entity 105-*d*, a UE 115-*b*, and a network entity 105-*e*, which may be examples of corresponding devices described with reference to FIGS. 1 and 2. One or both of the network entities 105 may be associated with an NTN. However, it is to be understood that the techniques and operations described with reference to FIG. 5 may also be applicable to terrestrial networks. In the following description of the process flow 500, operations between the UE 115-*b* and the network entities 105 may be performed in a different order or at a different time than as shown. Additionally or alternatively, some operations between the UE 115-*b* and the network entities 105 may be added or omitted.

At 505, the UE 115-*b* may establish a communication session with the network entity 105-*d* (e.g., a satellite). At 510, the UE 115-*b* may receive control signaling identifying one or more measurement trigger criteria for measurements of NTN cells. The control signaling may include RRC signaling, DCI, or a MAC-CE, among other examples. In some examples, the control signaling may indicate a network type, an orbit type, an NTN device identifier, a reference signal offset (with respect to the network entity 105-*d*), common TA parameters, or a combination thereof for a list of candidate cells or a list of candidate frequencies. Additionally or alternatively, the control signaling may indicate a measurement time window corresponding to a beam center associated with an NTN cell, a reference location, a location of the UE 115-*b*, a time duration in which one or more NTN cells can provide coverage to the UE 115-*b*, or a combination thereof. In some examples, the UE 115-*b* may transmit UE assistance that indicates a location of the UE 115-*b*, an estimated serving duration for an NTN cell supported by the network entity 105-*d*, or both.

At 515, the UE 115-*b* may perform a measurement of a reference signal from the network entity 105-*d*. The UE 115-*b* may determine an NRSRP associated with a serving cell of the UE 115-*b* (e.g., a cell supported by the network entity 105-*d*) based on the measurement of the reference signal from the network entity 105-*d*. At 520, the UE 115-*b* may determine that a change in NRSRP associated with the serving cell of the UE 115-*b* satisfies a signal power threshold. At 525, the UE 115-*b* may detect one or more of the measurement trigger criteria indicated by the control signaling. The UE 115-*b* may start a timer (T326) in response to determining that the change in NRSRP associated with the serving cell of the UE 115-*b* satisfies the signal power threshold or in response to detecting one or more of the measurement trigger criteria indicated by the control signaling. For example, the UE 115-*b* may start the timer based on determining that a distance between the UE 115-*b* and a reference location satisfies a distance-based measurement trigger threshold. The UE 115-*b* may also start the timer if a quantity of consecutive out-of-sync indications (obtained by lower layers) satisfies a threshold quantity and a distance between the UE and a reference location (corresponding to an NTN cell coverage area) is above a threshold distance. The UE 115-*b* may stop the timer if a quantity of in-sync indications (obtained by lower layers) satisfies a threshold quantity and the distance between the UE and the reference location is below the threshold distance. In some examples, the UE 115-*b* may trigger an RLF procedure upon expiry of the timer.

At 530, the UE 115-*b* may receive a reference signal from the network entity 105-*e* (e.g., a satellite). At 535, the UE 115-*b* may perform one or more measurements of an NTN cell supported by the network entity 105-*e*. The UE 115-*b* may perform measurements of the NTN cell supported by the network entity 105-*e* during a time period that is determined (by the UE 115-*b*) based on one or both of a change in NRSRP associated with the network entity 105-*d* satisfying a signal power threshold or at least one of the measurement trigger criteria being satisfied. In some examples, the UE 115-*b* may perform measurements of the NTN cell supported by the network entity 105-*e* after expiration of a timer (T326). The UE 115-*b* may start the timer when one or both of the signal power threshold or at least one of the measurement trigger criteria are satisfied. Alternatively, the UE 115-*b* may perform the measurements of the NTN cell supported by the network entity 105-*e* prior to expiration of the timer (e.g., while the timer is running). Thus, the time period (in which the UE 115-*b* performs NTN cell measurements) may correspond to a duration of the timer. In other examples, the UE 115-*b* may perform measurements of the NTN cell supported by the network entity 105-*e* within a time window indicated by the control signaling (e.g., while a time-based measurement trigger criterion is satisfied). In some examples, the UE 115-*b* may perform a retuning procedure from a first frequency (associated with the communication session between the UE 115-*b* and the network entity 105-*d*) to a second frequency (associated with one or more NTN cells).

Additionally or alternatively, the UE 115-*b* may perform measurements of the NTN cell supported by the network entity 105-*e* during a time period (scheduling gap) in which the UE 115-*b* does not expect to receive downlink communications from the network entity 105-*d*. This time period may include one or more PDCCH periods between a first time $T_1$ associated with transmission of HARQ-ACK feedback and a second time $T_2$ associated with a subsequent uplink or downlink transmission. The time period may be based on a downlink time slot in which the subsequent uplink or downlink transmission is scheduled, a TA value reported by the UE, an offset parameter indicated by a SIB, a HARQ RTT, or a combination thereof. In some examples, the UE 115-*b* may transmit a RACH message, a scheduling request, or an uplink message during a first portion of the time period that does not overlap with a second portion of the time period in which the UE 115-*b* performs measurements of the NTN cell supported by the network entity 105-*e*. At 540, the UE 115-*b* may report the NTN cell measurements to the network entity 105-*d*.

Aspects of the process flow 500 may be implemented to realize one or more of the following advantages. The techniques described with reference to FIG. 5 may enable the UE 115-*b* to perform NTN cell measurements with greater efficiency and reduced power consumption, among other benefits. For example, configuring the UE 115-*b* to refrain from measuring an NTN cell (e.g., a cell supported by the network entity 105-*e*) until the UE 115-*b* is within range of the NTN cell may reduce the number of extraneous measurements performed by the UE 115-*b*. Moreover, providing the UE 115-*b* with assistance information (e.g., location information, candidate cell information, timing information) may reduce the quantity of blind cell search procedures performed by the UE 115-*b*, which may reduce the latency and power consumption associated with cell search and selection at the UE 115-*b*.

Figure 6:
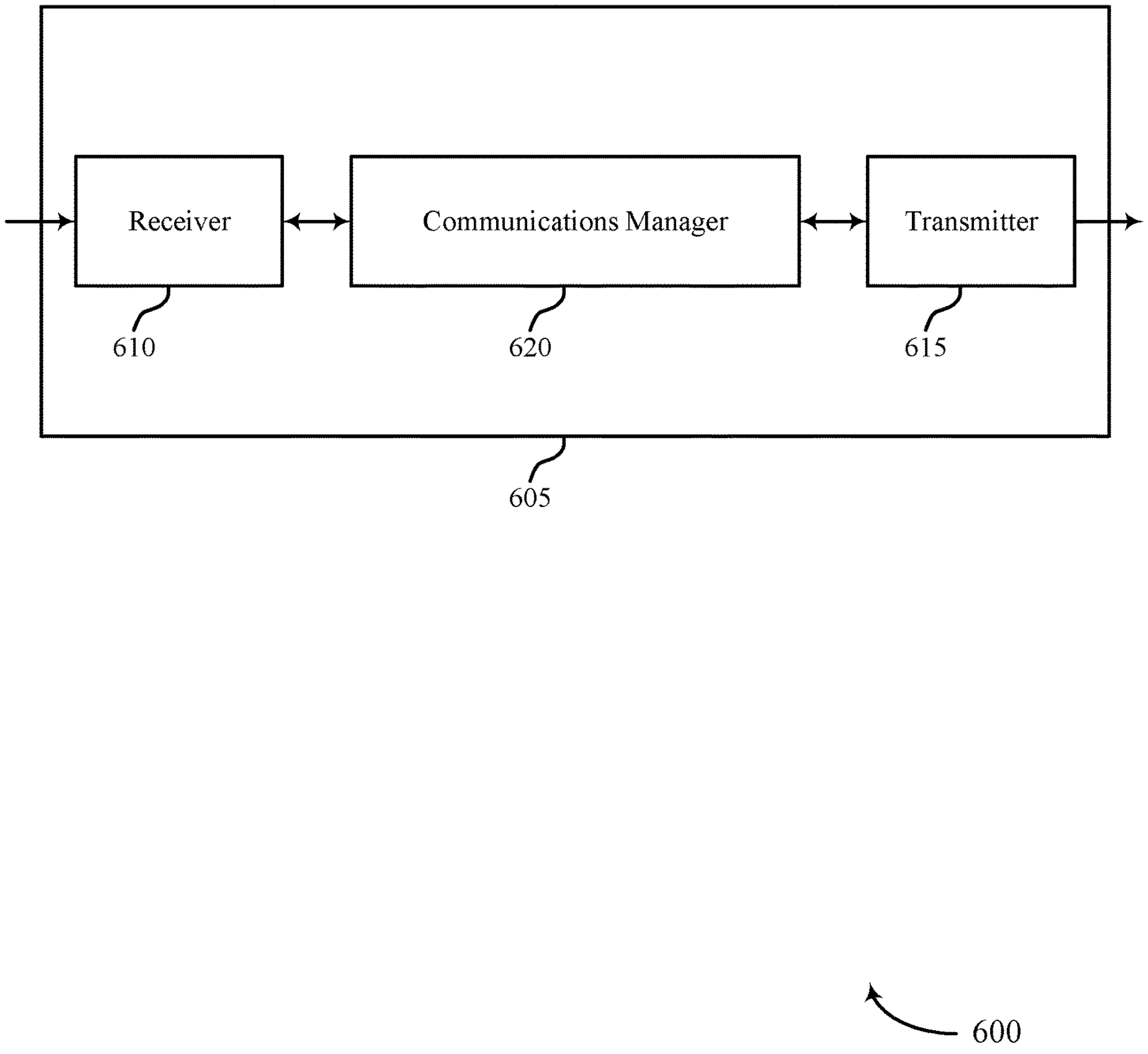
FIGS. 6 and 7 show block diagrams of devices that support techniques for performing non-terrestrial cell measurements in accordance with one or more aspects of the present disclosure.

FIG. 6 shows a block diagram 600 of a device 605 that supports techniques for performing non-terrestrial cell measurements in accordance with one or more aspects of the present disclosure. The device 605 may be an example of aspects of a UE 115, as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for performing non-terrestrial cell measurements). Information may be passed on to other components of the device 605. The receiver 610 may utilize a single antenna or multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for performing non-terrestrial cell measurements). In some examples, the transmitter 615 may be co-located with a receiver 610 in a transceiver module. The transmitter 615 may utilize a single antenna or multiple antennas.

The communications manager 620, the receiver 610, the transmitter 615, or various combinations thereof or various components thereof may be examples of means for performing various aspects of techniques for performing non-terrestrial cell measurements, as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations, as described herein.

The communications manager 620 may support wireless communications at the device 605 in accordance with examples disclosed herein. For example, the communications manager 620 may be configured as or otherwise support a means for establishing a communication session with a network via an NTN entity. The communications manager 620 may be configured as or otherwise support a means for receiving control signaling identifying one or more measurement trigger criteria for measurements of NTN cells. The communications manager 620 may be configured as or otherwise support a means for receiving a reference signal from one or more of the NTN cells. The communications manager 620 may be configured as or otherwise support a means for transmitting a message that indicates a measurement of the reference signal associated with at least one of the NTN cells, the measurement performed by the device 605 during a time period that is determined based on one or both of a change in received power associated with the NTN entity satisfying a signal power threshold or at least one of the one or more measurement trigger criteria being satisfied.

By including or configuring the communications manager 620 in accordance with examples described herein, the device 605 (e.g., a processor controlling or otherwise coupled with the receiver 610, the transmitter 615, the communications manager 620, or a combination thereof) may support techniques for reduced power consumption by decreasing the number of extraneous NTN cell measurements performed by the device 605. For example, the device 605 may refrain from performing NTN cell measurements unless one or more NTN-related measurement trigger criteria are met. As such, the device 605 may perform fewer cell measurements, which may enable the device 605 to attain greater power savings.

Figure 7:
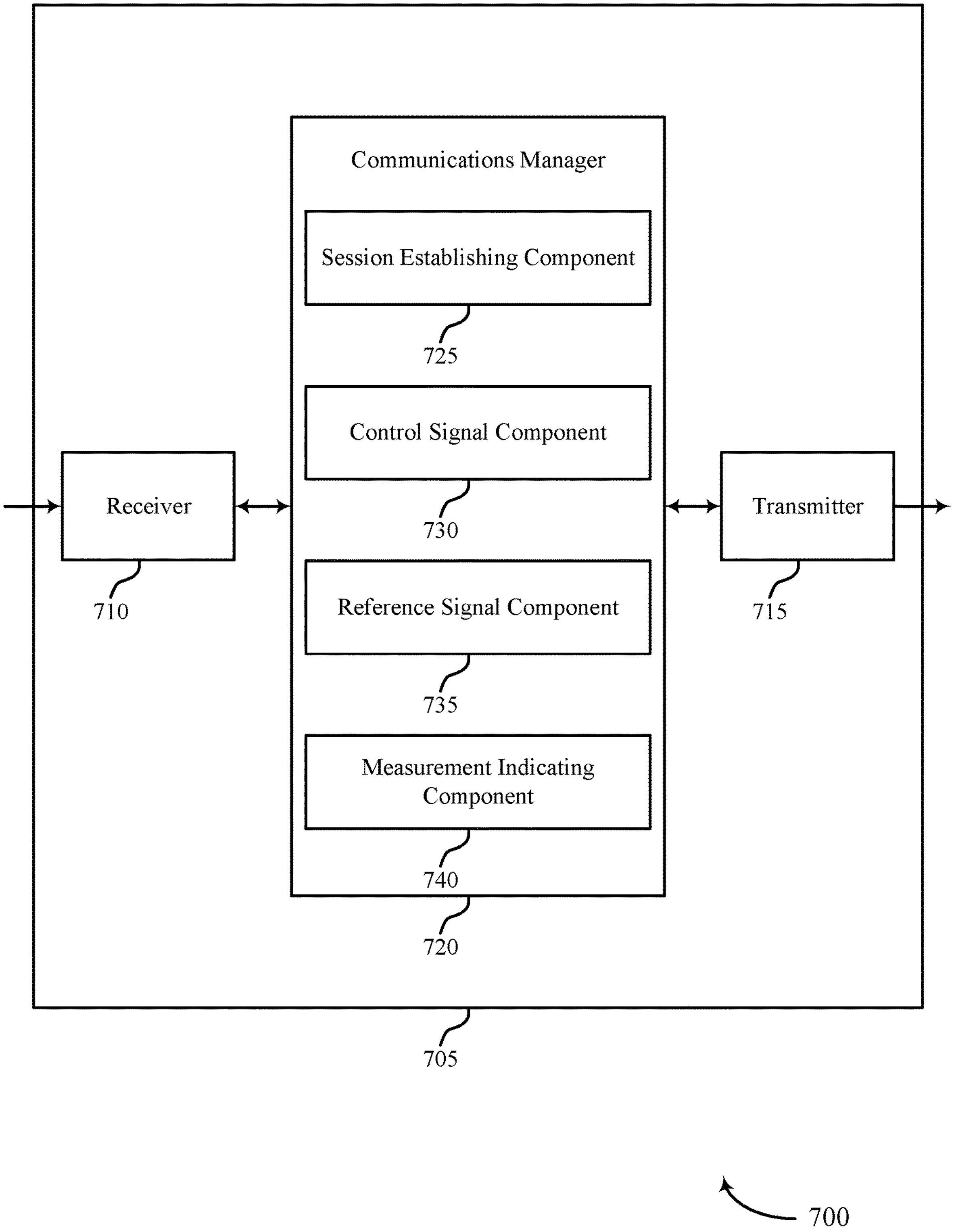

FIG. 7 shows a block diagram 700 of a device 705 that supports techniques for performing non-terrestrial cell measurements in accordance with one or more aspects of the present disclosure. The device 705 may be an example of aspects of a device 605 or a UE 115, as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for performing non-terrestrial cell measurements). Information may be passed on to other components of the device 705. The receiver 710 may utilize a single antenna or multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for performing non-terrestrial cell measurements). In some examples, the transmitter 715 may be co-located with a receiver 710 in a transceiver module. The transmitter 715 may utilize a single antenna or multiple antennas.

The device 705, or various components thereof, may be an example of means for performing various aspects of techniques for performing non-terrestrial cell measurements, as described herein. For example, the communications manager 720 may include a session establishing component 725, a control signal component 730, a reference signal component 735, a measurement indicating component 740, or any combination thereof. The communications manager 720 may be an example of aspects of a communications manager 620, as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations, as described herein.

The communications manager 720 may support wireless communications at the device 705 in accordance with examples disclosed herein. The session establishing component 725 may be configured as or otherwise support a means for establishing a communication session with a network via an NTN entity. The control signal component 730 may be configured as or otherwise support a means for receiving control signaling identifying one or more measurement trigger criteria for measurements of NTN cells. The reference signal component 735 may be configured as or otherwise support a means for receiving a reference signal from one or more of the NTN cells. The measurement indicating component 740 may be configured as or otherwise support a means for transmitting a message that indicates a measurement of the reference signal associated with at least one of the NTN cells, the measurement performed by the device 705 during a time period that is determined based on one or both of a change in received power associated with the NTN entity satisfying a signal power threshold or at least one of the one or more measurement trigger criteria being satisfied.

Figure 8:
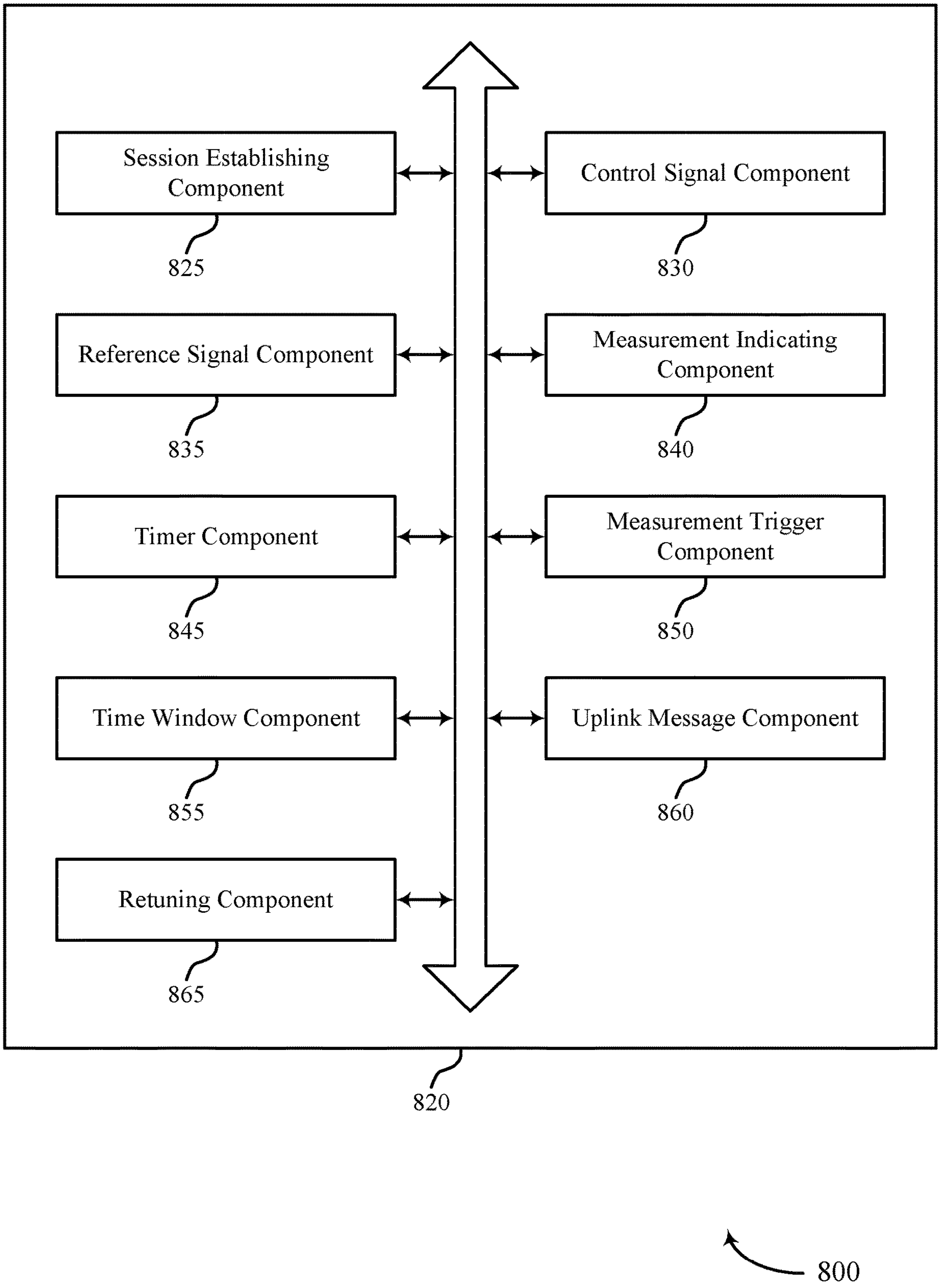
FIG. 8 shows a block diagram of a communications manager that supports techniques for performing non-terrestrial cell measurements in accordance with one or more aspects of the present disclosure.

FIG. 8 shows a block diagram 800 of a communications manager 820 that supports techniques for performing non-terrestrial cell measurements in accordance with one or more aspects of the present disclosure. The communications manager 820 may be an example of aspects of a communications manager 620, a communications manager 720, or both, as described herein. The communications manager 820, or various components thereof, may be an example of means for performing various aspects of techniques for performing non-terrestrial cell measurements, as described herein. For example, the communications manager 820 may include a session establishing component 825, a control signal component 830, a reference signal component 835, a measurement indicating component 840, a timer component 845, a measurement trigger component 850, a time window component 855, an uplink message component 860, a retuning component 865, or any combination thereof. Each of these components may communicate, directly or indirectly, with one another (e.g., via one or more buses).

The communications manager 820 may support wireless communications at a UE in accordance with examples disclosed herein. The session establishing component 825 may be configured as or otherwise support a means for establishing a communication session with a network via an NTN entity. The control signal component 830 may be configured as or otherwise support a means for receiving control signaling identifying one or more measurement trigger criteria for measurements of NTN cells. The reference signal component 835 may be configured as or otherwise support a means for receiving a reference signal from one or more of the NTN cells. The measurement indicating component 840 may be configured as or otherwise support a means for transmitting a message that indicates a measurement of the reference signal associated with at least one of the NTN cells, the measurement performed by the UE during a time period that is determined based on one or both of a change in received power associated with the NTN entity satisfying a signal power threshold or at least one of the one or more measurement trigger criteria being satisfied.

In some examples, the timer component 845 may be configured as or otherwise support a means for starting a timer after the change in received power associated with the NTN entity satisfies the signal power threshold, where the measurement of the reference signal is performed by the UE prior to expiry of the timer.

In some examples, the measurement trigger component 850 may be configured as or otherwise support a means for determining that a distance between the UE and a reference location satisfies a distance-based measurement trigger criterion of the one or more measurement trigger criteria identified by the control signaling, where the measurement of the reference signal is performed by the UE based on the distance-based measurement trigger criterion being satisfied.

In some examples, the measurement trigger component 850 may be configured as or otherwise support a means for determining that a time-based measurement trigger criterion of the one or more measurement trigger criteria is satisfied, where the measurement of the reference signal is performed by the UE based on the time-based measurement trigger criterion being satisfied.

In some examples, the time window component 855 may be configured as or otherwise support a means for identifying a time window in which the UE does not expect to be scheduled to communicate with the network, where the measurement of the reference signal is performed by the UE within the time window.

In some examples, the uplink message component 860 may be configured as or otherwise support a means for transmitting one or more of a random access message, a scheduling request, or an uplink message during a first portion of the time window, where the measurement of the reference signal is performed by the UE during a second portion of the time window that does not overlap with the first portion of the time window.

In some examples, the uplink message component 860 may be configured as or otherwise support a means for transmitting UE assistance information that indicates a location of the UE, an estimated serving duration for a cell supported by the NTN entity, or both.

In some examples, the timer component 845 may be configured as or otherwise support a means for starting a timer in response to determining that a quantity of consecutive out-of-synchronization indications obtained by the UE satisfies a threshold quantity and that a distance between the UE and a reference location corresponding to a coverage area of a cell supported by the NTN entity satisfies a distance-based measurement trigger criterion of the one or more measurement trigger criteria identified by the control signaling.

In some examples, the timer component 845 may be configured as or otherwise support a means for stopping the timer when a quantity of consecutive in-synchronization indications obtained by the UE satisfies a second threshold quantity and the distance between the UE and the reference location fails to satisfy the distance-based measurement trigger criterion.

In some examples, the measurement of the reference signal is performed by the UE prior to expiry of the timer. In other examples, the measurement of the reference signal is performed by the UE after expiry of the timer. In some examples, an RLF procedure is performed by the UE after expiry of the timer.

In some examples, the control signal component 830 may be configured as or otherwise support a means for receiving a control message indicating a list of candidate cells, a list of candidate frequencies, or any combination thereof, where the measurement of the reference signal is performed by the UE based on the control message.

In some examples, the control message indicates a network type, an orbit type, an NTN identifier, a reference signal offset with respect to the NTN entity, one or more common TA parameters, or a combination thereof for the list of candidate cells, the list of candidate frequencies, or both.

In some examples, the control signal component 830 may be configured as or otherwise support a means for receiving a control message indicating a measurement time window corresponding to a beam center associated with one of the NTN cells, a reference location, a location of the UE, a time duration in which at least one of the NTN cells can provide coverage to the UE, or a combination thereof, where the measurement of the reference signal is performed by the UE within the measurement time window.

In some examples, the retuning component 865 may be configured as or otherwise support a means for performing, by the UE prior to measurement of the reference signal associated with at least one of the NTN cells, a retuning procedure from a first frequency associated with the communication session to at least one second frequency associated with at least one of the NTN cells.

In some examples, the measurement of the reference signal is performed by the UE during a gap period between two scheduled transmissions. In some examples, the gap period includes one or more PDCCH periods. In some examples, the two scheduled transmissions include a HARQ feedback transmission and a subsequent uplink or downlink transmission.

In some examples, the gap period is based on a downlink time slot in which the subsequent uplink or downlink transmission is scheduled, a TA value reported by the UE, an offset parameter indicated by a SIB, a round trip time associated with the HARQ feedback transmission, or a combination thereof.

Figure 9:
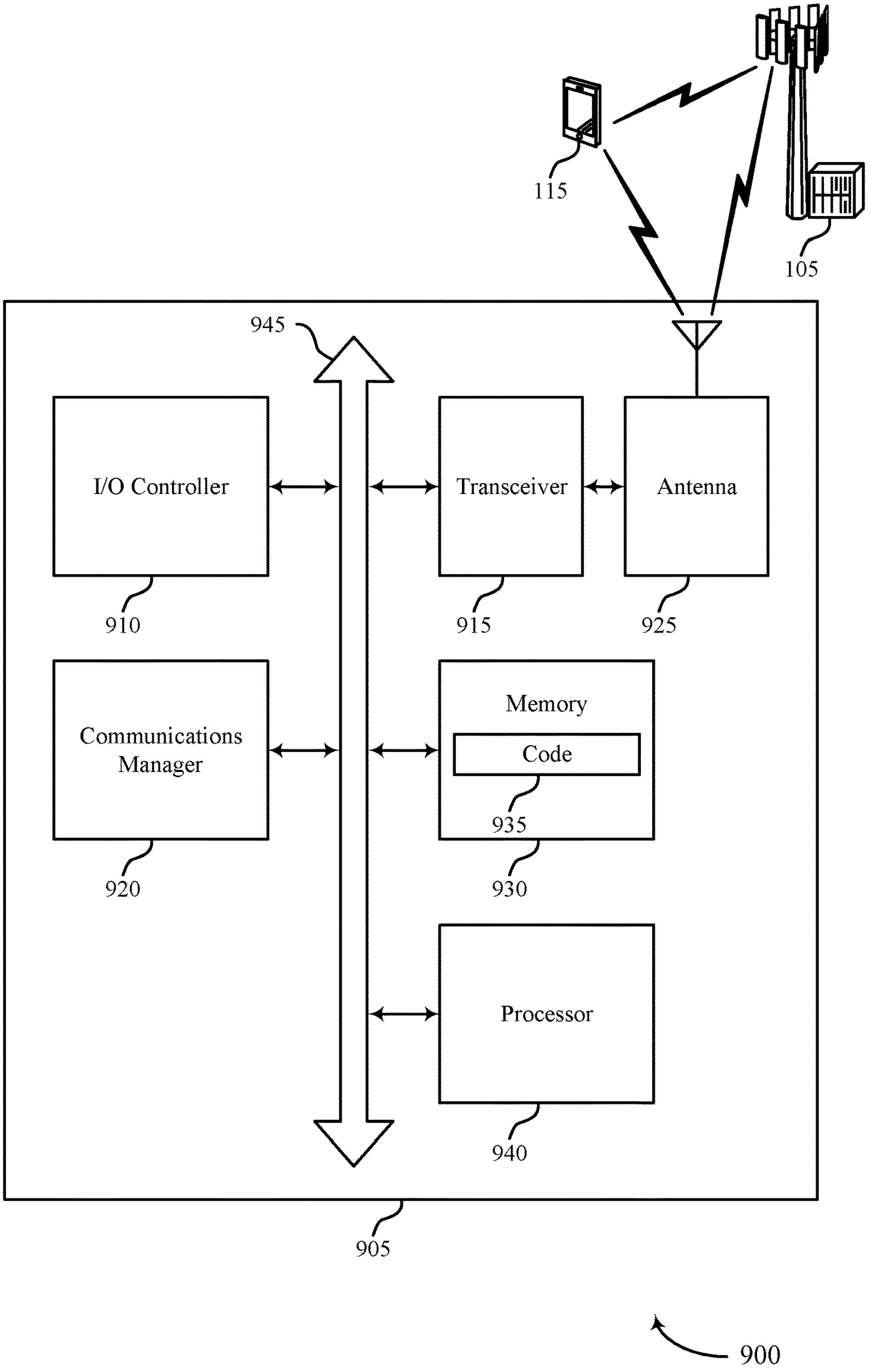
FIG. 9 shows a diagram of a system including a device that supports techniques for performing non-terrestrial cell measurements in accordance with one or more aspects of the present disclosure.

FIG. 9 shows a diagram of a system 900 including a device 905 that supports techniques for performing non-terrestrial cell measurements in accordance with one or more aspects of the present disclosure. The device 905 may be an example of or include the components of a device 605, a device 705, or a UE 115, as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links, as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for performing non-terrestrial cell measurements). For example, the device 905 or a component of the device 905 may include a processor 940 and memory 930 coupled with or to the processor 940, the processor 940 and memory 930 configured to perform various functions described herein.

The communications manager 920 may support wireless communications at the device 905 in accordance with examples disclosed herein. For example, the communications manager 920 may be configured as or otherwise support a means for establishing a communication session with a network via an NTN entity. The communications manager 920 may be configured as or otherwise support a means for receiving control signaling identifying one or more measurement trigger criteria for measurements of NTN cells. The communications manager 920 may be configured as or otherwise support a means for receiving a reference signal from one or more of the NTN cells. The communications manager 920 may be configured as or otherwise support a means for transmitting a message that indicates a measurement of the reference signal associated with at least one of the NTN cells, the measurement performed by the device 905 during a time period that is determined based on one or both of a change in received power associated with the NTN entity satisfying a signal power threshold or at least one of the one or more measurement trigger criteria being satisfied.

By including or configuring the communications manager 920 in accordance with examples described herein, the device 905 may support techniques for performing NTN cell measurements with greater efficiency and reduced power consumption, among other benefits. For example, a network entity may configure the device 905 to refrain from measuring an NTN cell (e.g., a cell supported by the network entity) until the device 905 is within range of the NTN cell, which may reduce the number of extraneous measurements performed by the device 905. Moreover, the network entity may provide the device 905 with assistance information (e.g., candidate cell information, timing information, network type information), which may reduce the quantity of blind cell search procedures performed by the device 905 as well as the latency and power consumption associated with cell search and selection at the device 905.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for performing non-terrestrial cell measurements, as described herein, or the processor 940 and the memory 930 may be otherwise configured to perform or support such operations.

Figure 10:
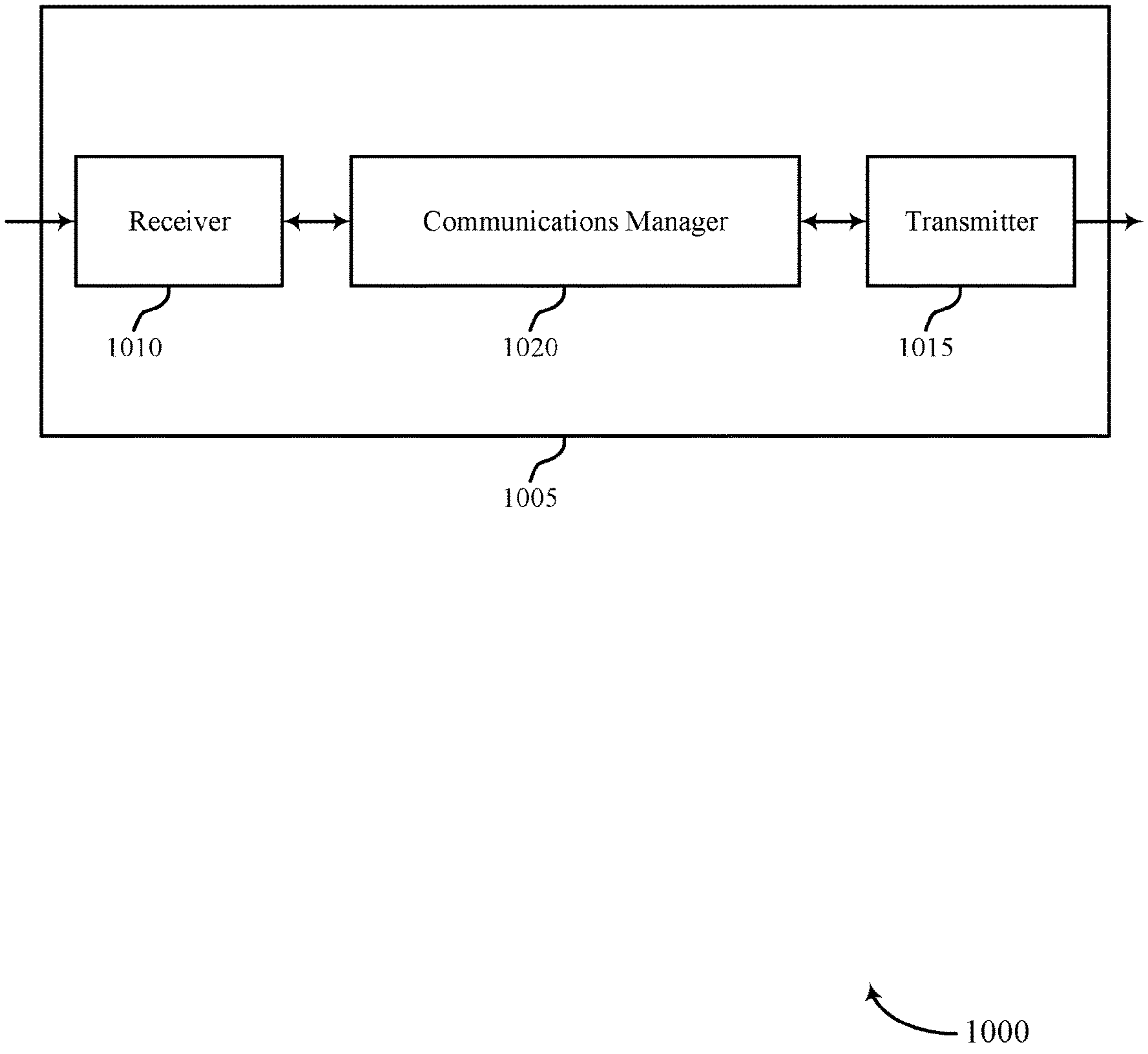
FIGS. 10 and 11 show block diagrams of devices that support techniques for performing non-terrestrial cell measurements in accordance with one or more aspects of the present disclosure.

FIG. 10 shows a block diagram 1000 of a device 1005 that supports techniques for performing non-terrestrial cell measurements in accordance with one or more aspects of the present disclosure. The device 1005 may be an example of aspects of a network entity 105, as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of techniques for performing non-terrestrial cell measurements, as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations, as described herein.

The communications manager 1020 may support wireless communications at the device 1005 in accordance with examples disclosed herein. For example, the communications manager 1020 may be configured as or otherwise support a means for establishing a communication session with a UE. The communications manager 1020 may be configured as or otherwise support a means for outputting control signaling identifying one or more measurement trigger criteria for measurements of NTN cells. The communications manager 1020 may be configured as or otherwise support a means for outputting a reference signal via an NTN cell supported by the device 1005. The communications manager 1020 may be configured as or otherwise support a means for obtaining a message that indicates a measurement of the reference signal associated with at least one of the NTN cells, the measurement performed during a time period that is determined based on one or both of a change in received power associated with the device 1005 satisfying a signal power threshold or at least one of the one or more measurement trigger criteria being satisfied.

By including or configuring the communications manager 1020 in accordance with examples described herein, the device 1005 (e.g., a processor controlling or otherwise coupled with the receiver 1010, the transmitter 1015, the communications manager 1020, or a combination thereof) may support techniques for reduced power consumption at a UE by decreasing the number of extraneous NTN cell measurements performed by the UE. For example, the device 1005 may configure the UE to refrain from performing NTN cell measurements unless one or more NTN-related measurement trigger criteria are met. As such, the UE may perform fewer cell measurements, which may enable the UE to attain greater power savings.

Figure 11:
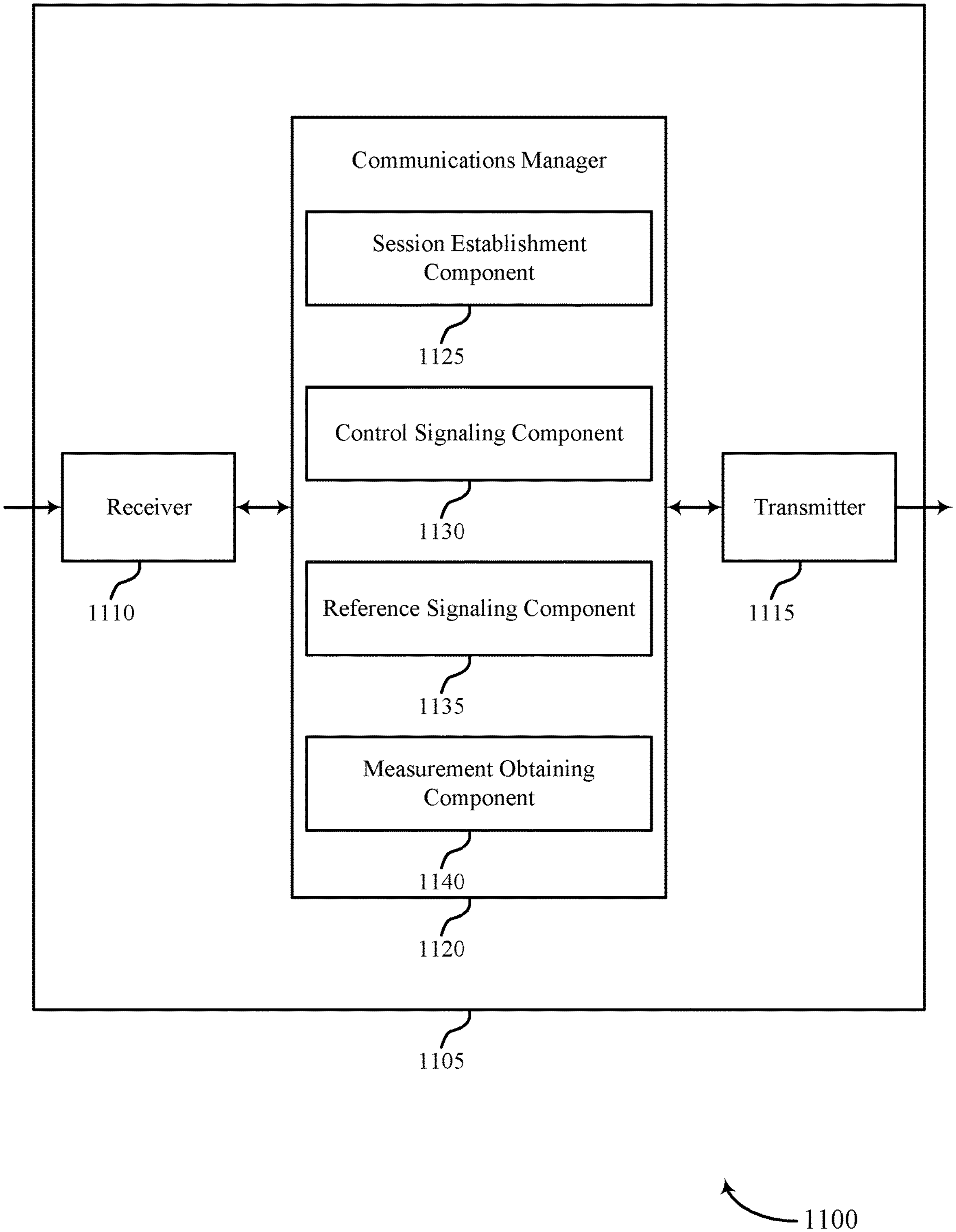

FIG. 11 shows a block diagram 1100 of a device 1105 that supports techniques for performing non-terrestrial cell measurements in accordance with one or more aspects of the present disclosure. The device 1105 may be an example of aspects of a device 1005 or a network entity 105, as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of techniques for performing non-terrestrial cell measurements, as described herein. For example, the communications manager 1120 may include a session establishment component 1125, a control signaling component 1130, a reference signaling component 1135, a measurement obtaining component 1140, or any combination thereof. The communications manager 1120 may be an example of aspects of a communications manager 1020, as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations, as described herein.

The communications manager 1120 may support wireless communications at the device 1105 in accordance with examples disclosed herein. The session establishment component 1125 may be configured as or otherwise support a means for establishing a communication session with a UE. The control signaling component 1130 may be configured as or otherwise support a means for outputting control signaling identifying one or more measurement trigger criteria for measurements of NTN cells. The reference signaling component 1135 may be configured as or otherwise support a means for outputting a reference signal via an NTN cell supported by the device 1105. The measurement obtaining component 1140 may be configured as or otherwise support a means for obtaining a message that indicates a measurement of the reference signal associated with at least one of the NTN cells, the measurement performed during a time period that is determined based on one or both of a change in received power associated with the device 1105 satisfying a signal power threshold or at least one of the one or more measurement trigger criteria being satisfied.

Figure 12:
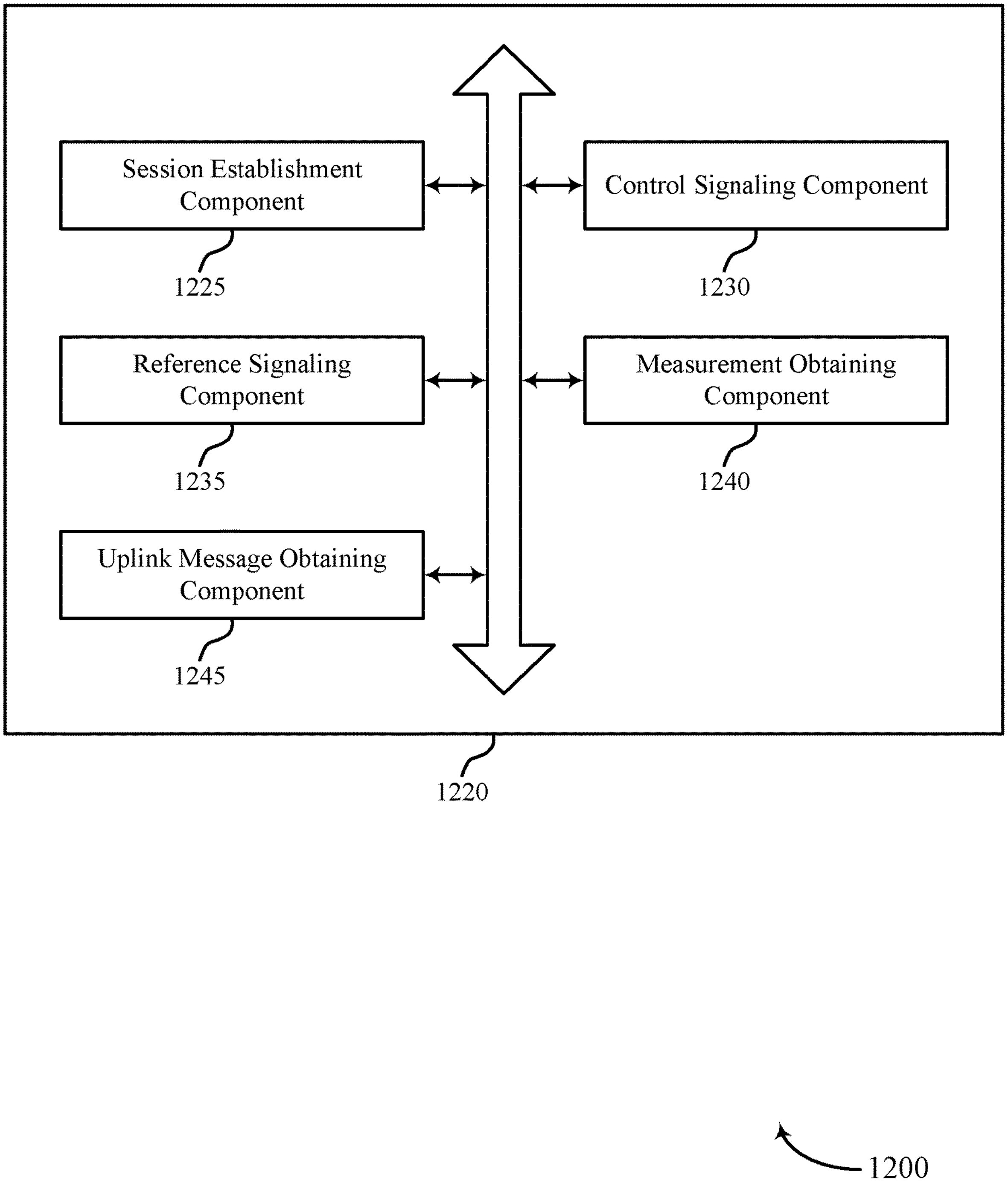
FIG. 12 shows a block diagram of a communications manager that supports techniques for performing non-terrestrial cell measurements in accordance with one or more aspects of the present disclosure.

FIG. 12 shows a block diagram 1200 of a communications manager 1220 that supports techniques for performing non-terrestrial cell measurements in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of techniques for performing non-terrestrial cell measurements, as described herein. For example, the communications manager 1220 may include a session establishment component 1225, a control signaling component 1230, a reference signaling component 1235, a measurement obtaining component 1240, an uplink message obtaining component 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples disclosed herein. The session establishment component 1225 may be configured as or otherwise support a means for establishing a communication session with a UE. The control signaling component 1230 may be configured as or otherwise support a means for outputting control signaling identifying one or more measurement trigger criteria for measurements of NTN cells. The reference signaling component 1235 may be configured as or otherwise support a means for outputting a reference signal via an NTN cell supported by the network entity. The measurement obtaining component 1240 may be configured as or otherwise support a means for obtaining a message that indicates a measurement of the reference signal associated with at least one of the NTN cells, the measurement performed during a time period that is determined based on one or both of a change in received power associated with the network entity satisfying a signal power threshold or at least one of the one or more measurement trigger criteria being satisfied.

In some examples, the measurement of the reference signal is performed prior to expiry of a timer that starts when the change in received power associated with the network entity satisfies the signal power threshold. In some examples, the control signaling indicates the signal power threshold, a duration of the timer, or both.

In some examples, the measurement of the reference signal is performed in response to a distance between the UE and a reference location satisfying a distance-based measurement trigger criterion of the one or more measurement trigger criteria identified by the control signaling.

In some examples, the measurement of the reference signal is performed in response to a time-based measurement trigger criterion of the one or more measurement trigger criteria being satisfied. In some examples, the measurement of the reference signal is performed within a time window in which the UE does not expect to be scheduled to communicate with the network entity.

In some examples, the uplink message obtaining component 1245 may be configured as or otherwise support a means for obtaining one or more of a random access message, a scheduling request, or an uplink message during a first portion of the time window, where the measurement of the reference signal is performed during a second portion of the time window that does not overlap with the first portion of the time window.

In some examples, the uplink message obtaining component 1245 may be configured as or otherwise support a means for obtaining UE assistance information that indicates a location of the UE, an estimated serving duration for the NTN cell supported by the network entity, or both.

In some examples, the measurement of the reference signal is performed in response to a quantity of consecutive out-of-synchronization indications satisfying a threshold quantity and a distance between the UE and the network entity satisfying a distance-based measurement trigger criterion of the one or more measurement trigger criteria identified by the control signaling.

In some examples, the control signaling component 1230 may be configured as or otherwise support a means for outputting a control message indicating a list of candidate cells, a list of candidate frequencies, or any combination thereof, where the measurement of the reference signal is performed based on the control message.

In some examples, the control signaling component 1230 may be configured as or otherwise support a means for outputting a control message indicating a measurement time window corresponding to a beam center associated with one of the NTN cells, a reference location, a location of the UE, a time duration in which at least one of the NTN cells can provide coverage to the UE, or a combination thereof, where the measurement of the reference signal is performed within the measurement time window.

Figure 13:
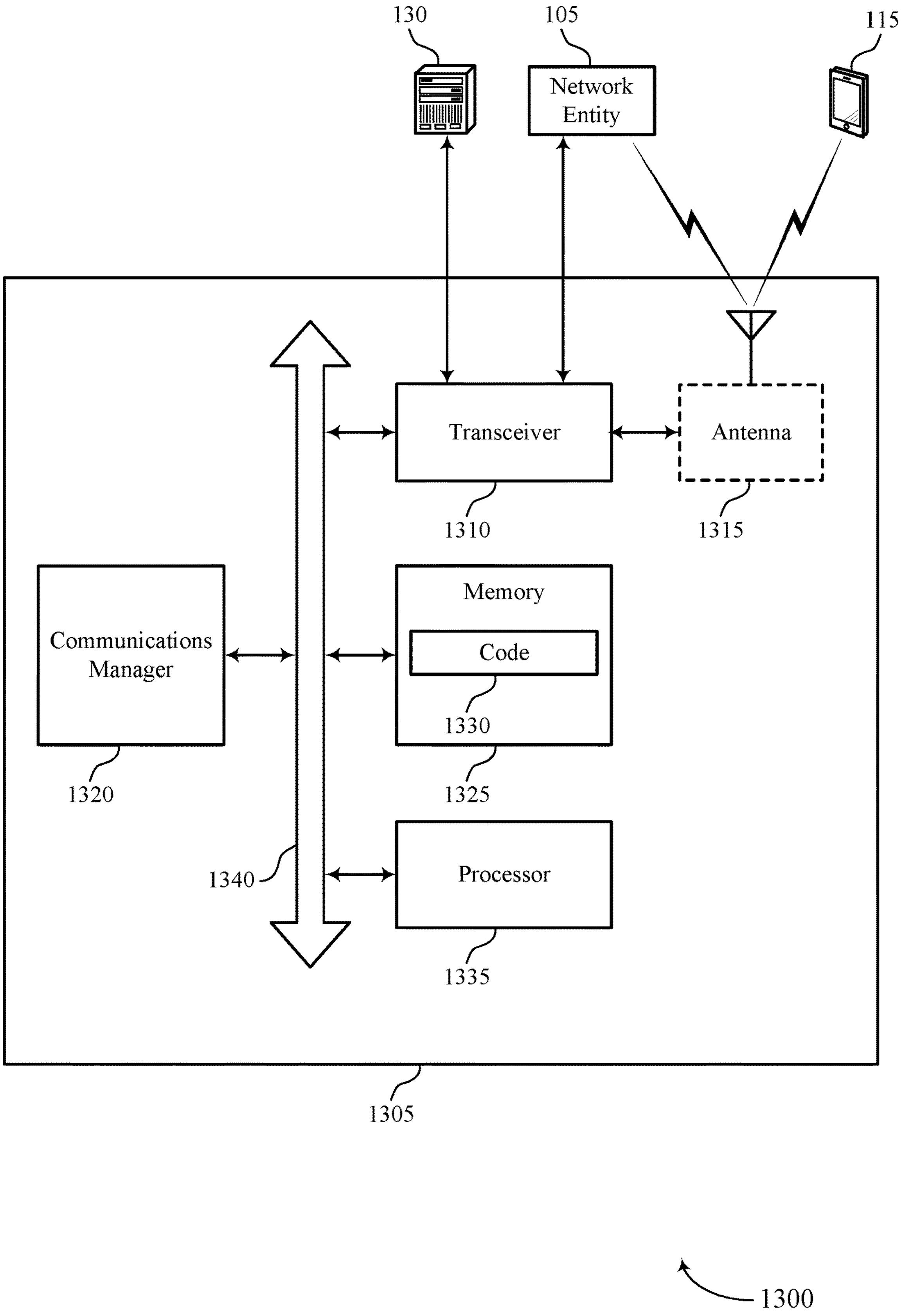
FIG. 13 shows a diagram of a system including a device that supports techniques for performing non-terrestrial cell measurements in accordance with one or more aspects of the present disclosure.

FIG. 13 shows a diagram of a system 1300 including a device 1305 that supports techniques for performing non-terrestrial cell measurements in accordance with one or more aspects of the present disclosure. The device 1305 may be an example of or include the components of a device 1005, a device 1105, or a network entity 105, as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both, as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting techniques for performing non-terrestrial cell measurements). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at the device 1305 in accordance with examples disclosed herein. For example, the communications manager 1320 may be configured as or otherwise support a means for establishing a communication session with a UE. The communications manager 1320 may be configured as or otherwise support a means for outputting control signaling identifying one or more measurement trigger criteria for measurements of NTN cells. The communications manager 1320 may be configured as or otherwise support a means for outputting a reference signal via an NTN cell supported by the device 1305. The communications manager 1320 may be configured as or otherwise support a means for obtaining a message that indicates a measurement of the reference signal associated with at least one of the NTN cells, the measurement performed during a time period that is determined based on one or both of a change in received power associated with the device 1305 satisfying a signal power threshold or at least one of the one or more measurement trigger criteria being satisfied.

By including or configuring the communications manager 1320 in accordance with examples described herein, the device 1305 may support techniques for performing NTN cell measurements with greater efficiency and reduced power consumption, among other benefits. For example, the device 1305 may configure a UE to refrain from measuring an NTN cell (e.g., a cell supported by the device 1305) until the UE is within range of the NTN cell, which may reduce the number of extraneous measurements performed by the UE. Moreover, the device 1305 may provide the UE with assistance information (e.g., candidate cell information, timing information, network type information), which may reduce the quantity of blind cell search procedures performed by the UE and the latency of cell search and selection procedures at the UE.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of techniques for performing non-terrestrial cell measurements, as described herein, or the processor 1335 and the memory 1325 may be otherwise configured to perform or support such operations.

Figure 14:
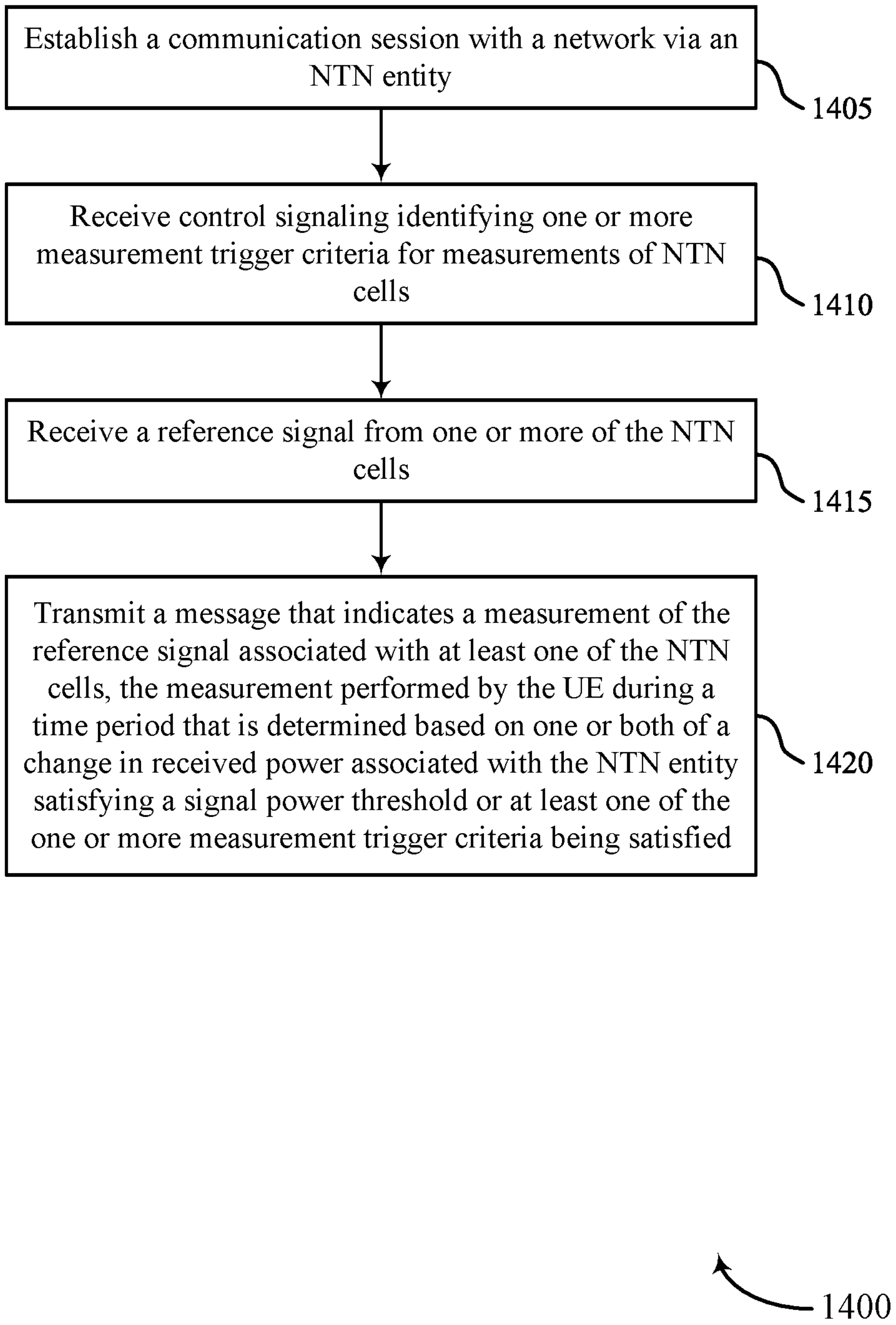
FIGS. 14 through 17 show flowcharts illustrating methods that support techniques for performing non-terrestrial cell measurements in accordance with one or more aspects of the present disclosure.

FIG. 14 shows a flowchart illustrating a method 1400 that supports techniques for performing non-terrestrial cell measurements in accordance with one or more aspects of the present disclosure. The operations of the method 1400 may be implemented by a UE or components of a UE. For example, the operations of the method 1400 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include establishing a communication session with a network via an NTN entity. The operations of 1405 may be performed in accordance with examples disclosed herein. In some examples, aspects of the operations of 1405 may be performed by a session establishing component 825, as described with reference to FIG. 8.

At 1410, the method may include receiving control signaling identifying one or more measurement trigger criteria for measurements of NTN cells. The operations of 1410 may be performed in accordance with examples disclosed herein. In some examples, aspects of the operations of 1410 may be performed by a control signal component 830, as described with reference to FIG. 8.

At 1415, the method may include receiving a reference signal from one or more of the NTN cells. The operations of 1415 may be performed in accordance with examples disclosed herein. In some examples, aspects of the operations of 1415 may be performed by a reference signal component 835, as described with reference to FIG. 8.

At 1420, the method may include transmitting a message that indicates a measurement of the reference signal associated with at least one of the NTN cells, the measurement performed by the UE during a time period that is determined based on one or both of a change in received power associated with the NTN entity satisfying a signal power threshold or at least one of the one or more measurement trigger criteria being satisfied. The operations of 1420 may be performed in accordance with examples disclosed herein. In some examples, aspects of the operations of 1420 may be performed by a measurement indicating component 840, as described with reference to FIG. 8.

Figure 15:
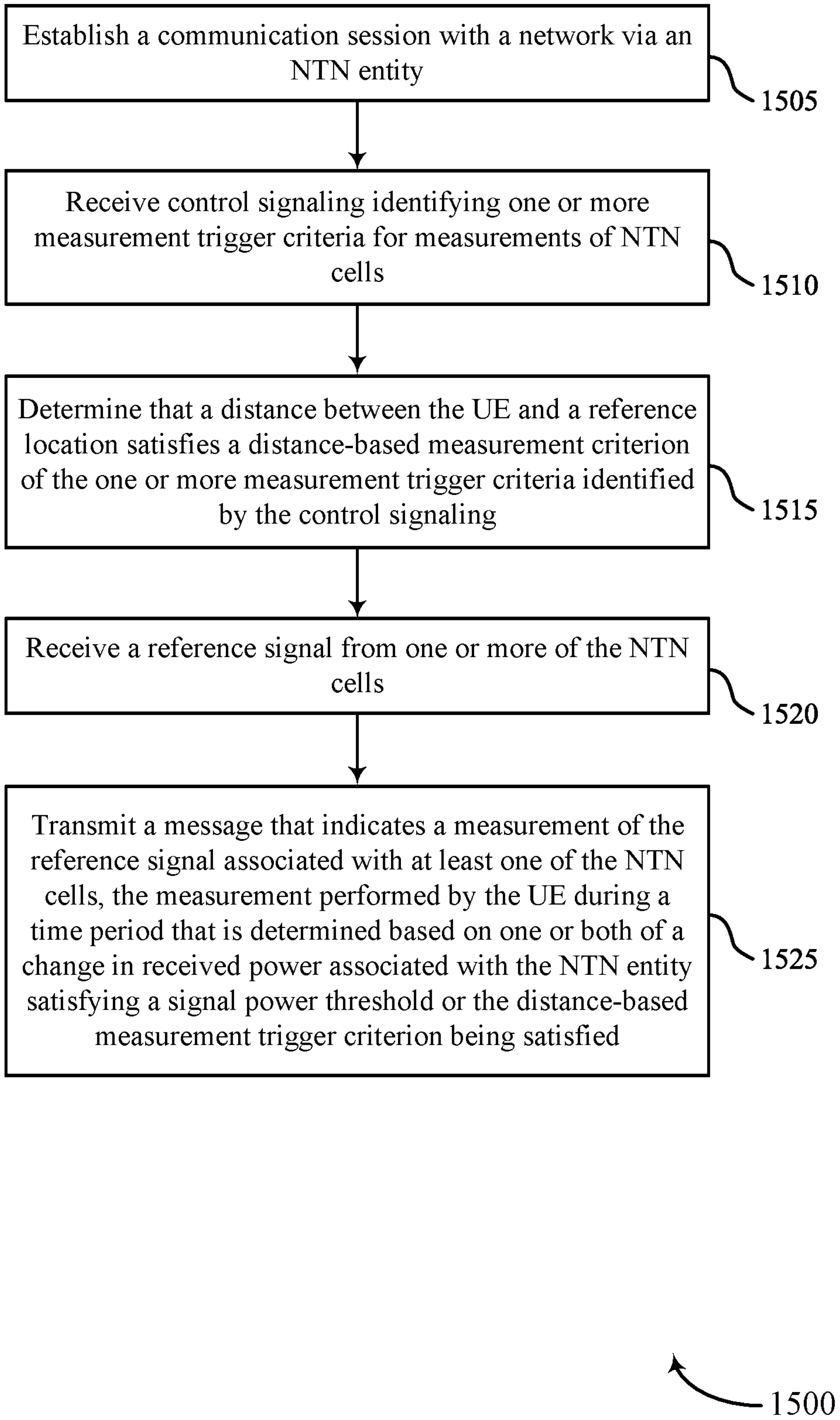

FIG. 15 shows a flowchart illustrating a method 1500 that supports techniques for performing non-terrestrial cell measurements in accordance with one or more aspects of the present disclosure. The operations of the method 1500 may be implemented by a UE or components of a UE. For example, the operations of the method 1500 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include establishing a communication session with a network via an NTN entity. The operations of 1505 may be performed in accordance with examples disclosed herein. In some examples, aspects of the operations of 1505 may be performed by a session establishing component 825, as described with reference to FIG. 8.

At 1510, the method may include receiving control signaling identifying one or more measurement trigger criteria for measurements of NTN cells. The operations of 1510 may be performed in accordance with examples disclosed herein. In some examples, aspects of the operations of 1510 may be performed by a control signal component 830, as described with reference to FIG. 8.

At 1515, the method may include determining that a distance between the UE and a reference location satisfies a distance-based measurement trigger criterion of the one or more measurement trigger criteria identified by the control signaling. The operations of 1515 may be performed in accordance with examples disclosed herein. In some examples, aspects of the operations of 1515 may be performed by a measurement trigger component 850, as described with reference to FIG. 8.

At 1520, the method may include receiving a reference signal from one or more of the NTN cells. The operations of 1520 may be performed in accordance with examples disclosed herein. In some examples, aspects of the operations of 1520 may be performed by a reference signal component 835, as described with reference to FIG. 8.

At 1525, the method may include transmitting a message that indicates a measurement of the reference signal associated with at least one of the NTN cells, the measurement performed by the UE during a time period that is determined based on a change in received power associated with the NTN entity satisfying a signal power threshold and the distance-based measurement trigger criterion being satisfied. The operations of 1525 may be performed in accordance with examples disclosed herein. In some examples, aspects of the operations of 1525 may be performed by a measurement indicating component 840, as described with reference to FIG. 8.

Figure 16:
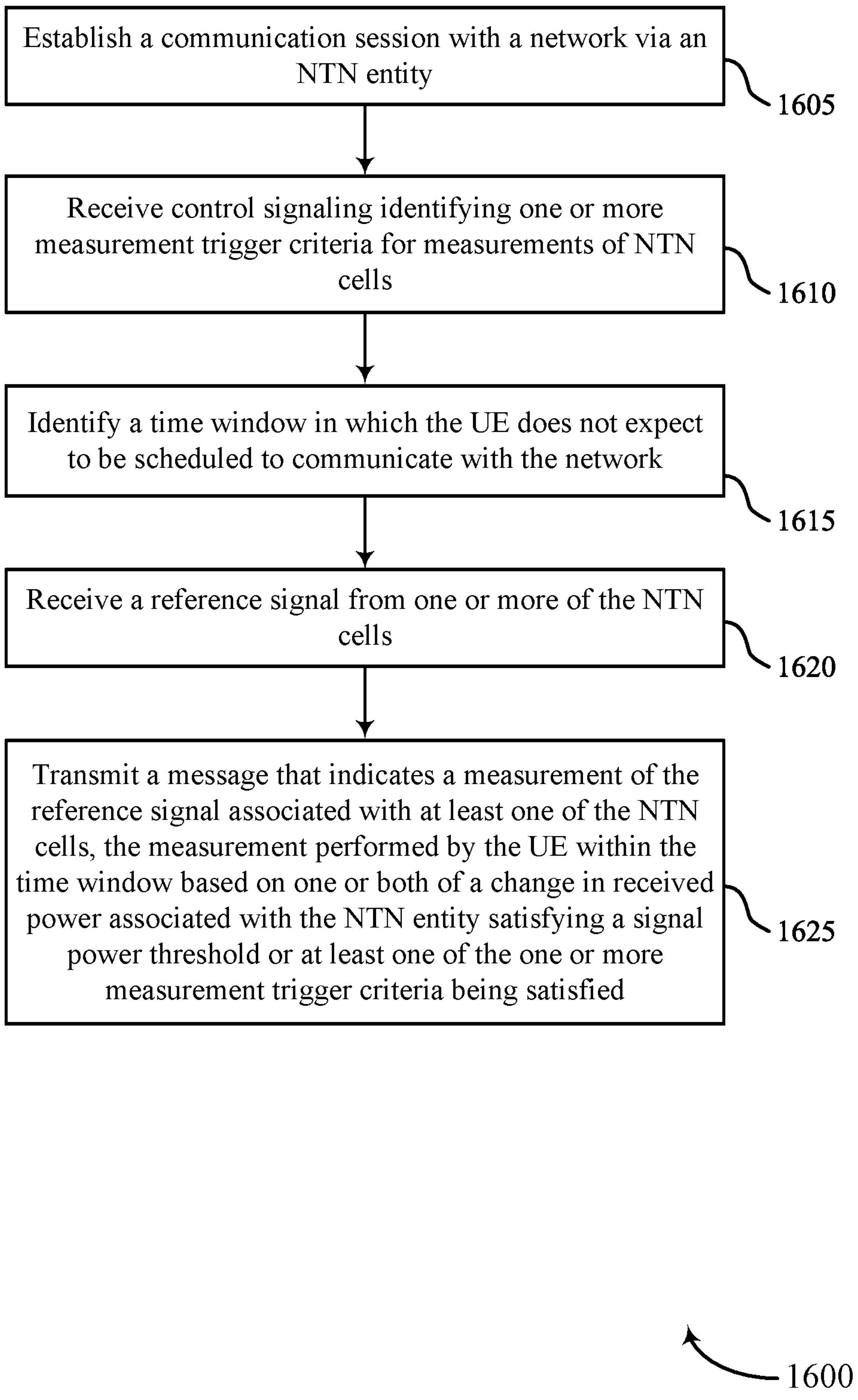

FIG. 16 shows a flowchart illustrating a method 1600 that supports techniques for performing non-terrestrial cell measurements in accordance with one or more aspects of the present disclosure. The operations of the method 1600 may be implemented by a UE or components of a UE. For example, the operations of the method 1600 may be performed by a UE 115, as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1605, the method may include establishing a communication session with a network via an NTN entity. The operations of 1605 may be performed in accordance with examples disclosed herein. In some examples, aspects of the operations of 1605 may be performed by a session establishing component 825, as described with reference to FIG. 8.

At 1610, the method may include receiving control signaling identifying one or more measurement trigger criteria for measurements of NTN cells. The operations of 1610 may be performed in accordance with examples disclosed herein. In some examples, aspects of the operations of 1610 may be performed by a control signal component 830, as described with reference to FIG. 8.

At 1615, the method may include identifying a time window in which the UE does not expect to be scheduled to communicate with the network. The operations of 1615 may be performed in accordance with examples disclosed herein. In some examples, aspects of the operations of 1615 may be performed by a time window component 855, as described with reference to FIG. 8.

At 1620, the method may include receiving a reference signal from one or more of the NTN cells. The operations of 1620 may be performed in accordance with examples disclosed herein. In some examples, aspects of the operations of 1620 may be performed by a reference signal component 835, as described with reference to FIG. 8.

At 1625, the method may include transmitting a message that indicates a measurement of the reference signal associated with at least one of the NTN cells, the measurement performed by the UE within the time window based on one or both of a change in received power associated with the NTN entity satisfying a signal power threshold or at least one of the one or more measurement trigger criteria being satisfied. The operations of 1625 may be performed in accordance with examples disclosed herein. In some examples, aspects of the operations of 1625 may be performed by a measurement indicating component 840, as described with reference to FIG. 8.

Figure 17:
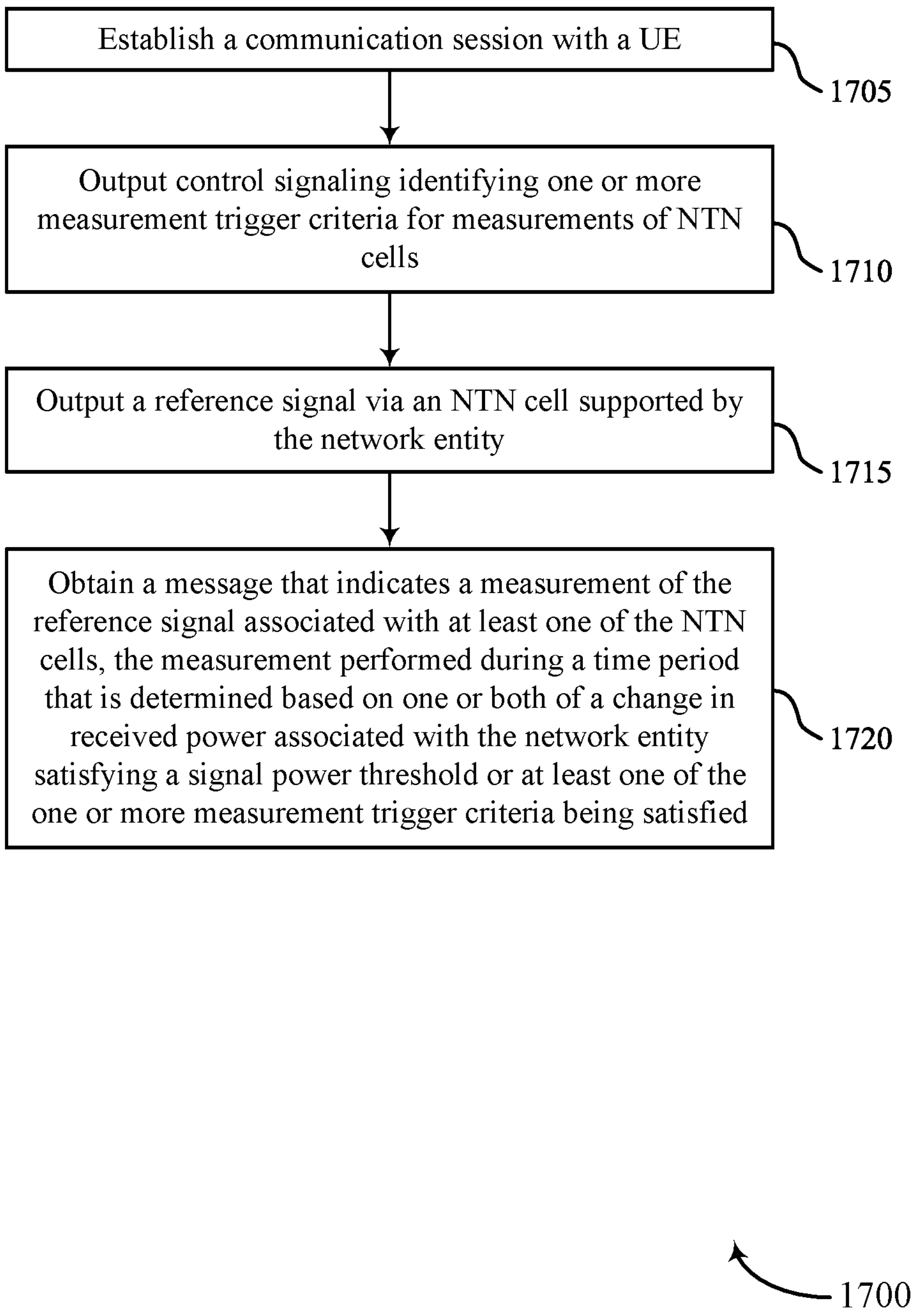

FIG. 17 shows a flowchart illustrating a method 1700 that supports techniques for performing non-terrestrial cell measurements in accordance with one or more aspects of the present disclosure. The operations of the method 1700 may be implemented by a network entity or components of a network entity. For example, the operations of the method 1700 may be performed by a network entity 105, as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include establishing a communication session with a UE. The operations of 1705 may be performed in accordance with examples disclosed herein. In some examples, aspects of the operations of 1705 may be performed by a session establishment component 1225, as described with reference to FIG. 12.

At 1710, the method may include outputting control signaling identifying one or more measurement trigger criteria for measurements of NTN cells. The operations of 1710 may be performed in accordance with examples disclosed herein. In some examples, aspects of the operations of 1710 may be performed by a control signaling component 1230, as described with reference to FIG. 12.

At 1715, the method may include outputting a reference signal via an NTN cell supported by the network entity. The operations of 1715 may be performed in accordance with examples disclosed herein. In some examples, aspects of the operations of 1715 may be performed by a reference signaling component 1235, as described with reference to FIG. 12.

At 1720, the method may include obtaining a message that indicates a measurement of the reference signal associated with at least one of the NTN cells, the measurement performed during a time period that is determined based on one or both of a change in received power associated with the network entity satisfying a signal power threshold or at least one of the one or more measurement trigger criteria being satisfied. The operations of 1720 may be performed in accordance with examples disclosed herein. In some examples, aspects of the operations of 1720 may be performed by a measurement obtaining component 1240, as described with reference to FIG. 12.

The following provides an overview of aspects of the present disclosure:

Aspect 1: A method for wireless communications at a UE, comprising: establishing a communication session with a network via a non-terrestrial network entity; receiving control signaling identifying one or more measurement trigger criteria for measurements of non-terrestrial network cells; receiving a reference signal from one or more of the non-terrestrial network cells; and transmitting a message that indicates a measurement of the reference signal associated with at least one of the non-terrestrial network cells, the measurement performed by the UE during a time period that is determined based at least in part on one or both of a change in received power associated with the non-terrestrial network entity satisfying a signal power threshold or at least one of the one or more measurement trigger criteria being satisfied.

Aspect 2: The method of aspect 1, further comprising: starting a timer for the time period after the change in received power associated with the non-terrestrial network entity satisfies the signal power threshold, wherein the measurement of the reference signal is performed by the UE prior to expiry of the timer.

Aspect 3: The method of any of aspects 1 through 2, further comprising: determining that a distance between the UE and a reference location satisfies a distance-based measurement trigger criterion of the one or more measurement trigger criteria identified by the control signaling, wherein the measurement of the reference signal is performed by the UE based at least in part on the distance-based measurement trigger criterion being satisfied.

Aspect 4: The method of any of aspects 1 through 3, further comprising: determining that a time-based measurement trigger criterion of the one or more measurement trigger criteria is satisfied, wherein the measurement of the reference signal is performed by the UE based at least in part on the time-based measurement trigger criterion being satisfied.

Aspect 5: The method of any of aspects 1 through 4, further comprising: identifying a time window in which the UE does not expect to be scheduled to communicate with the network, wherein the measurement of the reference signal is performed by the UE within the time window.

Aspect 6: The method of aspect 5, further comprising: transmitting one or more of a random access message, a scheduling request, or an uplink message during a first portion of the time window, wherein the measurement of the reference signal is performed by the UE during a second portion of the time window that does not overlap with the first portion of the time window.

Aspect 7: The method of any of aspects 1 through 6, further comprising: transmitting UE assistance information that indicates a location of the UE, an estimated serving duration for a cell supported by the non-terrestrial network entity, or both.

Aspect 8: The method of any of aspects 1 through 7, further comprising: starting a timer for the time period in response to determining that a quantity of consecutive out-of-synchronization indications obtained by the UE satisfies a threshold quantity and that a distance between the UE and a reference location corresponding to a coverage area of a cell supported by the non-terrestrial network entity satisfies a distance-based measurement trigger criterion of the one or more measurement trigger criteria identified by the control signaling.

Aspect 9: The method of aspect 8, further comprising: stopping the timer when a quantity of consecutive in-synchronization indications obtained by the UE satisfies a second threshold quantity and the distance between the UE and the reference location fails to satisfy the distance-based measurement trigger criterion.

Aspect 10: The method of any of aspects 8 through 9, wherein the measurement of the reference signal is performed by the UE prior to expiry of the timer.

Aspect 11: The method of any of aspects 8 through 9, wherein the measurement of the reference signal is performed by the UE after expiry of the timer.

Aspect 12: The method of any of aspects 8 through 11, wherein a radio link failure procedure is performed by the UE after expiry of the timer.

Aspect 13: The method of any of aspects 1 through 12, further comprising: receiving a control message indicating a list of candidate cells, a list of candidate frequencies, or any combination thereof, wherein the measurement of the reference signal is performed by the UE based at least in part on the control message.

Aspect 14: The method of aspect 13, wherein the control message indicates a network type, an orbit type, a non-terrestrial network identifier, a reference signal offset with respect to the non-terrestrial network entity, one or more common timing advance parameters, or a combination thereof for the list of candidate cells, the list of candidate frequencies, or both.

Aspect 15: The method of any of aspects 1 through 14, further comprising: receiving a control message indicating a measurement time window corresponding to a beam center associated with one of the non-terrestrial network cells, a reference location, a location of the UE, a time duration in which at least one of the non-terrestrial network cells can provide coverage to the UE, or a combination thereof, wherein the measurement of the reference signal is performed by the UE within the measurement time window.

Aspect 16: The method of any of aspects 1 through 15, further comprising: performing, by the UE prior to measurement of the reference signal associated with at least one of the non-terrestrial network cells, a retuning procedure from a first frequency associated with the communication session to at least one second frequency associated with at least one of the non-terrestrial network cells.

Aspect 17: The method of any of aspects 1 through 16, wherein the measurement of the reference signal is performed by the UE during a gap period between two scheduled transmissions; the gap period comprises one or more physical downlink control channel periods; and the two scheduled transmissions comprise a hybrid automatic repeat request feedback transmission and a subsequent uplink or downlink transmission.

Aspect 18: The method of aspect 17, wherein the gap period is based at least in part on a downlink time slot in which the subsequent uplink or downlink transmission is scheduled, a timing advance value reported by the UE, an offset parameter indicated by a system information block, a round trip time associated with the hybrid automatic repeat request feedback transmission, or a combination thereof.

Aspect 19: A method for wireless communications at a network entity, comprising: establishing a communication session with a UE; outputting control signaling identifying one or more measurement trigger criteria for measurements of non-terrestrial network cells; outputting a reference signal via a non-terrestrial network cell supported by the network entity; and obtaining a message that indicates a measurement of the reference signal associated with at least one of the non-terrestrial network cells, the measurement performed during a time period that is determined based at least in part on one or both of a change in received power associated with the network entity satisfying a signal power threshold or at least one of the one or more measurement trigger criteria being satisfied.

Aspect 20: The method of aspect 19, wherein the measurement of the reference signal is performed prior to expiry of a timer for the time period that starts when the change in received power associated with the network entity satisfies the signal power threshold; and the control signaling indicates the signal power threshold, a duration of the timer, or both.

Aspect 21: The method of any of aspects 19 through 20, wherein the measurement of the reference signal is performed in response to a distance between the UE and a reference location satisfying a distance-based measurement trigger criterion of the one or more measurement trigger criteria identified by the control signaling.

Aspect 22: The method of any of aspects 19 through 21, wherein the measurement of the reference signal is performed in response to a time-based measurement trigger criterion of the one or more measurement trigger criteria being satisfied.

Aspect 23: The method of any of aspects 19 through 22, wherein the measurement of the reference signal is performed within a time window in which the UE does not expect to be scheduled to communicate with the network entity.

Aspect 24: The method of aspect 23, further comprising: obtaining one or more of a random access message, a scheduling request, or an uplink message during a first portion of the time window, wherein the measurement of the reference signal is performed during a second portion of the time window that does not overlap with the first portion of the time window.

Aspect 25: The method of any of aspects 19 through 24, further comprising: obtaining UE assistance information that indicates a location of the UE, an estimated serving duration for the non-terrestrial network cell supported by the network entity, or both.

Aspect 26: The method of any of aspects 19 through 25, wherein the measurement of the reference signal is performed in response to a quantity of consecutive out-of-synchronization indications satisfying a threshold quantity and a distance between the UE and the network entity satisfying a distance-based measurement trigger criterion of the one or more measurement trigger criteria identified by the control signaling.

Aspect 27: The method of any of aspects 19 through 26, further comprising: outputting a control message indicating a list of candidate cells, a list of candidate frequencies, or any combination thereof, wherein the measurement of the reference signal is performed based at least in part on the control message.

Aspect 28: The method of any of aspects 19 through 27, further comprising: outputting a control message indicating a measurement time window corresponding to a beam center associated with one of the non-terrestrial network cells, a reference location, a location of the UE, a time duration in which at least one of the non-terrestrial network cells can provide coverage to the UE, or a combination thereof, wherein the measurement of the reference signal is performed within the measurement time window.

Aspect 29: An apparatus for wireless communications at a UE, comprising: a processor; memory coupled with the processor; and instructions stored in the memory and executable by the processor to cause the apparatus to perform a method of any of aspects 1 through 18.

Aspect 30: An apparatus for wireless communications at a UE, comprising at least one means for performing a method of any of aspects 1 through 18.

Aspect 31: A non-transitory computer-readable medium storing code for wireless communications at a UE, the code comprising instructions executable by a processor to perform a method of any of aspects 1 through 18.

Aspect 32: An apparatus for wireless communications at a network entity, comprising: a processor; memory coupled with the processor; and instructions stored in the memory and executable by the processor to cause the apparatus to perform a method of any of aspects 19 through 28.

Aspect 33: An apparatus for wireless communications at a network entity, comprising at least one means for performing a method of any of aspects 19 through 28.

Aspect 34: A non-transitory computer-readable medium storing code for wireless communications at a network entity, the code comprising instructions executable by a processor to perform a method of any of aspects 19 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:

a processor;

memory coupled with the processor; and instructions stored in the memory and executable by the processor to cause the apparatus to:

establish a communication session with a network via a non-terrestrial network entity;

receive control signaling indicating a reference location and a threshold distance associated with a distance-based measurement trigger criterion for measurement of one or more non-terrestrial network cells associated with the non-terrestrial network entity;

start a timer for a time period after a change in received power associated with the non-terrestrial network entity satisfies a signal power threshold; and perform, prior to expiration of the timer, a measurement of one or more reference signals associated with a first non-terrestrial network cell of the one or more non-terrestrial network cells, the measurement performed by the UE based at least in part on a distance between the UE and the reference location satisfying the threshold distance associated with the distance-based measurement trigger criterion.

2. The apparatus of claim 1, wherein the instructions are further executable by the processor to cause the apparatus to:

determine that a time-based measurement trigger criterion is satisfied, wherein the measurement of the one or more reference signals is performed by the UE based at least in part on the time-based measurement trigger criterion being satisfied.

3. The apparatus of claim 1, wherein the instructions are further executable by the processor to cause the apparatus to:

identify a time window in which the UE does not expect to be scheduled to communicate with the network, wherein the measurement of the one or more reference signals is performed by the UE within the time window.

4. The apparatus of claim 3, wherein the instructions are further executable by the processor to cause the apparatus to:

transmit one or more of a random access message, a scheduling request, or an uplink message during a first portion of the time window, wherein the measurement of the one or more reference signals is performed by the UE during a second portion of the time window that does not overlap with the first portion of the time window.

5. The apparatus of claim 1, wherein the instructions are further executable by the processor to cause the apparatus to:

transmit UE assistance information that indicates a location of the UE, an estimated serving duration for a cell supported by the non-terrestrial network entity, or both.

6. The apparatus of claim 1, wherein the instructions are further executable by the processor to cause the apparatus to:

start the timer in response to determining that a quantity of consecutive out-of-synchronization indications obtained by the UE satisfies a threshold quantity and that the distance between the UE and the reference location corresponding to a coverage area of a cell supported by the non-terrestrial network entity satisfies the threshold distance associated with the distance-based measurement trigger criterion.

7. The apparatus of claim 6, wherein the instructions are further executable by the processor to cause the apparatus to:

stop the timer when a quantity of consecutive in-synchronization indications obtained by the UE satisfies a second threshold quantity and the distance between the UE and the reference location fails to satisfy the distance-based measurement trigger criterion.

8. The apparatus of claim 6, wherein the measurement of the one or more reference signals is performed by the UE prior to expiry of the timer.

9. The apparatus of claim 6, wherein the measurement of the one or more reference signals is performed by the UE after expiry of the timer.

10. The apparatus of claim 6, wherein a radio link failure procedure is performed by the UE after expiry of the timer.

11. The apparatus of claim 1, wherein the instructions are further executable by the processor to cause the apparatus to:

receive a control message indicating a list of candidate cells, a list of candidate frequencies, or any combination thereof, wherein the measurement of the one or more reference signals is performed by the UE based at least in part on the control message.

12. The apparatus of claim 11, wherein the control message indicates a network type, an orbit type, a non-terrestrial network identifier, a reference signal offset with respect to the non-terrestrial network entity, one or more common timing advance parameters, or a combination thereof for the list of candidate cells, the list of candidate frequencies, or both.

13. The apparatus of claim 1, wherein the instructions are further executable by the processor to cause the apparatus to:

receive a control message indicating a measurement time window corresponding to a beam center associated with one of the one or more non-terrestrial network cells, the reference location, a location of the UE, a time duration in which at least one of the one or more non-terrestrial network cells can provide coverage to the UE, or a combination thereof, wherein the measurement of the one or more reference signals is performed by the UE within the measurement time window.

14. The apparatus of claim 1, wherein the instructions are further executable by the processor to cause the apparatus to:

perform, by the UE prior to measurement of the one or more reference signals associated with the first non-terrestrial network cell of the one or more non-terrestrial network cells, a retuning procedure from a first frequency associated with the communication session to at least one second frequency associated with at least one of the one or more non-terrestrial network cells.

15. The apparatus of claim 1, wherein:

the measurement of the one or more reference signals is performed by the UE during a gap period between two scheduled transmissions;

the gap period comprises one or more physical downlink control channel periods; and the two scheduled transmissions comprise a hybrid automatic repeat request feedback transmission and a subsequent uplink or downlink transmission.

16. The apparatus of claim 15, wherein the gap period is based at least in part on the subsequent uplink or downlink transmission, a timing advance value reported by the UE, an offset parameter indicated by a system information block, a round trip time associated with the hybrid automatic repeat request feedback transmission, or a combination thereof.

17. An apparatus for wireless communications at a network entity, comprising:

a processor;

memory coupled with the processor; and instructions stored in the memory and executable by the processor to cause the apparatus to:

establish a communication session with a user equipment (UE);

output control signaling indicating a reference location and a threshold distance associated with a distance-based measurement trigger criterion for measurement of one or more non-terrestrial network cells associated with the network entity, wherein the control signaling further indicates a signal power threshold, a duration of a timer, or both associated with starting of the timer at the UE for measurement, by the UE, of one or more reference signals prior to expiry of the timer when a change in received power associated with the network entity satisfies the signal power threshold; and obtain, based at least in part on the control signaling, a message that indicates the measurement, by the UE, of the one or more reference signals associated with a first non-terrestrial network cell of the one or more non-terrestrial network cells based at least in part on a distance between the UE and the reference location satisfying the threshold distance associated with the distance-based measurement trigger criterion.

18. The apparatus of claim 17, wherein the control signaling indicates a time-based measurement trigger criterion for measurement of the one or more non-terrestrial network cells.

19. The apparatus of claim 17, wherein the network entity does not schedule communication with the UE during a time window between a first transmission and a second transmission.

20. The apparatus of claim 19, wherein the instructions are further executable by the processor to cause the apparatus to:

obtain one or more of a random access message, a scheduling request, or an uplink message during a first portion of the time window.

21. The apparatus of claim 17, wherein the instructions are further executable by the processor to cause the apparatus to:

obtain UE assistance information that indicates a location of the UE, an estimated serving duration for the first non-terrestrial network cell supported by the network entity, or both.

22. The apparatus of claim 17, wherein the instructions are further executable by the processor to cause the apparatus to:

output a control message indicating a list of candidate cells, a list of candidate frequencies, or any combination thereof.

23. The apparatus of claim 17, wherein the instructions are further executable by the processor to cause the apparatus to:

output a control message indicating a measurement time window corresponding to a beam center associated with one of the one or more non-terrestrial network cells, the reference location, a location of the UE, a time duration in which at least one of the one or more non-terrestrial network cells can provide coverage to the UE, or a combination thereof.

24. A method for wireless communications at a user equipment (UE), comprising:

establishing a communication session with a network via a non-terrestrial network entity;

receiving control signaling indicating a reference location and a threshold distance associated with a distance-based measurement trigger criterion for measurement of one or more non-terrestrial network cells associated with the non-terrestrial network entity;

starting a timer for a time period after a change in received power associated with the non-terrestrial network entity satisfies a signal power threshold; and performing, prior to expiration of the timer, a measurement of one or more reference signals associated with a first non-terrestrial network cell of the one or more non-terrestrial network cells, the measurement performed by the UE based at least in part on a distance between the UE and the reference location satisfying the threshold distance associated with the distance-based measurement trigger criterion.

25. A method for wireless communications at a network entity, comprising:

establishing a communication session with a user equipment (UE);

outputting control signaling indicating a reference location and a threshold distance associated with a distance-based measurement trigger criterion for measurement of one or more non-terrestrial network cells associated with the network entity, wherein the control signaling further indicates a signal power threshold, a duration of a timer, or both associated with starting of the timer at the UE for measurement, by the UE, of one or more reference signals prior to expiry of the timer when a change in received power associated with the network entity satisfies the signal power threshold; and obtaining, based at least in part on the control signaling, a message that indicates the measurement, by the UE, of the one or more reference signals associated with a first non-terrestrial network cell of the one or more non-terrestrial network cells based at least in part on a distance between the UE and the reference location satisfying the threshold distance associated with the distance-based measurement trigger criterion.

* * * * *